US009596807B2

(12) United States Patent
Nürnberg et al.

(10) Patent No.: US 9,596,807 B2
(45) Date of Patent: Mar. 21, 2017

(54) LOADING AND TRANSPORT APPARATUS FOR AGRICULTURAL CUTTING DEVICES

(71) Applicant: CNH Industrial America LLC, New Holland, PA (US)

(72) Inventors: Alexander Nürnberg, Herdecke (DE); Didier O. M. Verhaeghe, Ieper (BE); Wolfgang Oehler, Wipperfürth (DE)

(73) Assignee: CNH Industrial America LLC, New Holland, PA (US)

( * ) Notice: Subject to any disclaimer, the term of this patent is extended or adjusted under 35 U.S.C. 154(b) by 81 days.

(21) Appl. No.: 14/384,860

(22) PCT Filed: Mar. 13, 2013

(86) PCT No.: PCT/EP2013/055099
§ 371 (c)(1),
(2) Date: Sep. 12, 2014

(87) PCT Pub. No.: WO2013/135752
PCT Pub. Date: Sep. 19, 2013

(65) Prior Publication Data
US 2015/0050108 A1     Feb. 19, 2015

(30) Foreign Application Priority Data

Mar. 13, 2012   (DE) .................. 10 2012 102 084

(51) Int. Cl.
*B60P 1/24*     (2006.01)
*A01D 75/00*    (2006.01)
*A01B 73/00*    (2006.01)

(52) U.S. Cl.
CPC .......... *A01D 75/002* (2013.01); *A01B 73/005* (2013.01); *A01D 75/004* (2013.01)

(58) Field of Classification Search
CPC ............................. A01D 90/083; B60P 1/24
(Continued)

(56) References Cited

U.S. PATENT DOCUMENTS 6,419,431 B1    7/2002  Kuhns
6,428,047 B1 *  8/2002  Kaderabek ........... A01B 73/005
                                                    280/781
(Continued)

FOREIGN PATENT DOCUMENTS

DE      19902687 A1    8/1999
EP       0105055 A1    4/1984
(Continued)

*Primary Examiner* — Jonathan Snelting
(74) *Attorney, Agent, or Firm* — Patrick M. Sheldrake

(57) ABSTRACT

A loading and transport apparatus for an agricultural header or implement that comprises a primary tool and a secondary tool, comprising a guide frame. On the guide frame is arranged a first support device having a first rest surface for movably holding the primary tool. On the guide frame is further arranged a second support device having a second rest surface for movably holding the secondary tool. A coupling element is arranged to the first support device, wherein the coupling element connects the first support device to the second support device. To the guide frame is arranged a support element, which contacts the second support device, wherein the coupling element and the support element are designed and arranged such that a movement of the first support device in a first direction along the guide frame effects lifting of the second rest surface.

15 Claims, 25 Drawing Sheets

(58) Field of Classification Search
USPC .......................................................... 414/470
See application file for complete search history.

(56) References Cited

U.S. PATENT DOCUMENTS

| | | | |
|---|---|---|---|
| 7,413,210 B1 | 8/2008 | Ross | |
| 8,616,812 B2 * | 12/2013 | Bergen | A01D 75/002 280/789 |
| 8,714,594 B1 * | 5/2014 | Hellbusch | A01D 75/002 280/140 |
| 8,740,249 B1 * | 6/2014 | Hellbusch | A01D 75/002 280/140 |

FOREIGN PATENT DOCUMENTS

| | | | | |
|---|---|---|---|---|
| EP | 1066744 A1 | | 1/2001 | |
| EP | 1219152 A1 * | | 7/2002 | A01D 75/002 |
| FR | 2899766 A1 | | 10/2007 | |
| WO | WO 2013135752 A1 * | | 9/2013 | A01D 75/002 |

* cited by examiner

LOADING AND TRANSPORT APPARATUS FOR AGRICULTURAL CUTTING DEVICES

This application is the US National Stage filing of International Application Serial No. PCT/EP2013/055099 filed on Mar. 13, 2013 which claims priority to German Application 10.2012.102.084.1 filed Mar. 13, 2012, each of which is incorporated herein by reference in its entirety.

TECHNICAL FIELD OF THE INVENTION

The invention relates to a loading and transport apparatus for an agricultural header or implement that comprises a primary tool and a secondary tool.

The invention relates further to a trailer for loading and transporting such agricultural header or implement, wherein the trailer comprises a plurality of such loading and transport apparatuses.

In particular, the tools can comprise cutting devices of a utility vehicle. The cutting devices may be used in particular for mowing, cutting and/or chopping grass, straw, grain, wheat, corn, rape seed, sunflowers, beans, other stalks or other plants and parts of plants. The utility vehicle may in particular be a combine harvester.

STATE OF THE ART

A loading and transport apparatus for an agricultural header comprising a primary tool and a secondary tool, as well as a trailer comprising such apparatus are known from European patent application 1 219 152 A1. In particular, the utility vehicle is constituted by a combine harvester, which has for a header a cutting unit comprising a main cutting device as a primary tool and a rape seed front cutting extension as a secondary tool. The trailer comprises a single loading and transport apparatus, onto which the complete cutting unit can be put down for transport thereby. This loading and transport apparatus is designed such that the front cutting extension and the main cutting device on the trailer are positionable relative to each other and accordingly can be connected to or disconnected from each other. To this end the loading and transport apparatus comprises a first support device having a first rest surface for supporting the primary tool and a second support device having a second rest surface for supporting the secondary tool.

The first support device is connected by means of a relatively complex combination of hydraulic cylinders, lift arms, levers, shafts and connection elements to the frame of the trailer. An angle element of the second support device is rigidly connected to a connection element of the first support device. The full complex cinematic is designed to allow for a relative movement of both rest surfaces with respect to each other.

Object of the Invention

It is the object of the invention to provide a loading and transport apparatus for an agricultural header or implement having a primary and a secondary tool, as well as a trailer comprising a plurality of such apparatuses, which facilitates the loading and unloading of the header or implement and which can be installed universally on existing trailers for the transport of various agricultural headers or implements.

Solution

According to the invention, the object of the invention is achieved by the features of the independent patent claims.

Further preferred embodiments of the invention are referred to in the dependent patent claims.

SUMMARY OF THE INVENTION

The invention relates to a loading and transport apparatus for an agricultural header or implement that comprises a primary tool and a secondary tool. The apparatus comprises a guide frame and a first support device that is movably arranged on the guide frame and has a first rest surface for holding the primary tool. Further is provided a second support device that is movably arranged on the guide frame and has a second rest surface for holding the secondary tool. On the first support device is arranged a coupling element that connects the first support device to the second support device. On the guide frame is arranged a support element, which contacts the second support device, wherein the coupling element and the support element are constituted and arranged such that a movement of the first support device in a first direction along the guide frame effects lifting of the second rest surface The invention further relates to a trailer for loading and transporting an agricultural header or implement that comprises a primary tool and a secondary tool. The trailer comprises a plurality of loading and transport apparatuses of the type described above, wherein the loading and transport apparatuses are attached to the frame of the trailer.

DEFINITIONS

Utility vehicle: in this application "utility vehicle" is understood to include a self-propelled utility vehicle, a pull-type utility vehicle, a mowing device, a mowing machine, a combine harvester or a tractor, which each comprise a header or implement as defined below.

Header: a "header" is understood to include a device of a utility vehicle that is arranged to its front in the normal driving direction of the utility vehicle.

Implement: an "implement" is understood to include a device of a utility vehicle, which is arranged on the utility vehicle at any location thereof.

Tool: a "tool" is understood to comprise a unit of an agricultural header or implement, which performs particular agricultural operations. These may comprise mowing, cutting or chopping. Other possible operations comprise soil working, tilling the soil, collecting plant components, sowing, etc. Hence, the tool may comprise, e.g., a mowing device, a cutting device, a swathing device, a stripper or a corn header.

Agricultural cutting device: in the present application, an "agricultural cutting device" is a cutting device for cutting, mowing, chopping, comminuting, mulching, etc. of plant material in the sector of agriculture and forestry, in the municipal sector for the maintenance of public green spaces and for the maintenance of other spaces having plants.

Guide frame: in the present application "guide frame of the loading and transport apparatus" is not referring to the frame or other part of the trailer itself, but to a part of the actual loading and transport apparatus. The guide frame is used to guide the movable support device and may in a simple embodiment be constituted by a plate shaped element.

BACKGROUND

In particular, the utility vehicle can be a combine harvester. The agricultural cutting device then preferably is used as a secondary cutting device. As generally known, the combine harvester has a main cutting device for cutting the crop material, e.g., wheat. In particular the secondary cutting device then is mounted to the rear of the so-called "header" of the combine harvester. The combine harvester may in particular be conceived such that its main cutting device for the harvest is set at a higher position, i.e., at a greater vertical distance from the soil, than in the prior art. This reduces the amount of stalk material introduced in the combine harvester. The secondary cutting device then is used to cut and chop the relatively long remaining stubble stalks from the soil.

When the header or implement has a width of more than 2.50 m, it is forbidden or at least dangerous to travel on public roads in some countries. Hence, for the transport of the header or implement to and from the operation field, the header or implement must be detached from the utility vehicle. The detached header or implement is then loaded onto a trailer and transported thereby, wherein the header or implement is rotated about 90 with respect to its usual operative direction.

FURTHER DESCRIPTION

The new loading and transport apparatus for an agricultural header or implement facilitates the loading and unloading operations onto and from a trailer and the secure transport on public roads.

To this end, the first support device for the primary tool of the header or implement and the second support device for the secondary tool of the header or implement are cinematically linked to each other in a particular manner. The movement of the first support device in a first direction along the guide frame of the loading and transport apparatus effects through a coupling element the lifting of the second rest surface. Correspondingly, the reverse movement of the first support will effect the lowering of the second rest surface. Both tools are thereby transferred in joint coordination from a loading position into a transport position. In the loading position it is possible to attach and detach the header or implement to and from the utility vehicle, while in the transport position the width of the loading and transport apparatus in a direction transverse to the travel direction is minimised.

The header or implement can thereby be (un)loaded and transported completely, i.e., including the primary tool and the secondary tool. A disassembly of one or even several tools is not required.

There is no need for special trailers, as a common trailer can be equipped with a plurality of new loading and transport apparatuses. This substantially reduces the costs for the user, as he does not have to obtain a special trailer. At the same time, it is also possible to convert a standard trailer simply from a first type of loading and transport apparatus into a second type of loading and transport apparatus, when another header or implement should be loaded and transported. Also this substantially reduces the acquisition costs.

By using various adjustment possibilities, also the loading and transport apparatus can be adapted to different agricultural headers or implements. E.g., the first rest surface of the first support device can be pivotable with respect to the guide frame.

Because of the special design of the loading and transport apparatus, the loading forces are thereby absorbed, and not or only partially transferred onto the trailer structure.

The second support device can comprise a support arm having a guide surface that contacts the support element such that the geometry of the guide surface defines the direction of movement of the second rest surface. When the loading and transport apparatus is changed from the loading position into the transport position and vice versa, the guide surface will slide along the support element. Distinct geometries of the guide surface can also be used to define the movement path of the second rest surface. Herein, the support arm preferably is supported by the support element and the guide surface slides during a movement of the first support device over the support element. The guide surface preferably is rectilinear. However, it may also be curved, at least in some sections.

The movement of the first support device may be substantially translational. Hence, it does not involve a primarily rotational movement, wherein "translational" movement is not meaning that this movement must me strictly rectilinear. Usually this movement is substantially horizontal. However, it may also be slightly linear or curvedly rising. Anyhow, it is preferred that the movement is not substantially vertical or rotational as the very heavy header or implement must not be lifted substantially during the loading operation.

The coupling element may comprise a linkage bolt that hingeably connects the second support device to the first support device. Because of the substantially translational movement of the first support device and the transmitted movement of the second support device there is a resulting angle change at this coupling element. This change of angle is enabled by the linkage bolt.

The position of the support element and/or the coupling element relative to guide frame can be adjustable. These adjustments allow for the adaptation of the loading and transport apparatus to distinct headers or implements.

The second support device may comprise a support arm having a first end and a second end, wherein the first end is connected to the first support device and the second end is designed as a free end, the second rest surface being arranged in the proximity of the free end. Such support arm can be moved very effectively from the loading position into the transport position.

The distance between the first end of the support arm and the second rest surface may be adjustable. Also this enables a flexible adaptation of the loading and transport apparatus to distinct agricultural headers or implements.

The first support device may be connected to a drive. This drive causes the required movement of the first support device relative to the guide frame. For example, the drive may comprise a piston-cylinder unit.

The primary tool and the secondary tool may each comprise a cutting device. In a preferred embodiment, the utility vehicle is a combine harvester provided with a header. The primary tool then is the main cutting device of the combine harvester. The secondary tool is a further cutting device, which is used for cutting the stubble that is left behind by the main cutting device.

The loading and transport apparatuses may be mounted without holes to the frame of a trailer. This allows for a very quick and flexible adaptation of the loading and transport apparatuses to distinct headers or implements. The loading and transport apparatuses may be adjustably attached, e.g., by means of a plurality of clamps, to the frame of the trailer.

The loading and transport apparatuses are directly or indirectly connected to the frame of the trailer.

Each of the loading and transport apparatuses preferably has a loading position and a transport position, wherein the distance in the vertical and horizontal directions between the second rest surfaces of the second support device of the loading and transport apparatuses and the frame of the trailer is maximal in the loading position and minimal in the transport position. This results, on the one hand, in a good attachment and detachment possibility for the loading and transport apparatus to and from the utility vehicle and in the reduced overall width of the trailer, as well as of the header or implement that is loaded thereon.

Advantageous further developments of the invention are disclosed in the claims, the description and the drawings. The advantages of features and combinations of various features mentioned in the introduction to the description are by way of example only, and may come into effect alternatively or cumulatively, without the benefits having to be obtained in a compulsory manner by embodiments of the invention.

Without affecting the scope of the accompanying claims, the following applies to the disclosure of the original application materials and the ensuing patent: further features may be derived from the drawings—in particular the geometries represented and the relative dimensions of several components to one another, as well as their relative arrangement and functional connection. The combination of features of different embodiments of the invention or of features of different claims is also possible by way of a departure from the chosen references of the patent claims and is hereby suggested. This also applies to those features which are illustrated in separate drawings or are referred to in their description. These features may also be combined with features of different patent claims. Likewise, features listed in the patent claims may be omitted for further embodiments of the invention.

The features referred to in the claims and the specification are to be understood, in terms of their number, as exactly that number or a larger number than the indicated number, without the need for the explicit use of the words "at least". For example, when a rest surface is mentioned, this should be understood either as precisely one rest surface, or two rest surfaces or more rest surfaces being present. If, however, an exact number of a feature is being referred to, the adjective "just" is inserted before the appropriate feature.

These features may be supplemented by other features or may be the only features that constitute the apparatus.

BRIEF DESCRIPTION OF THE FIGURES

The invention is further explained and described below with reference to preferred embodiments as shown in the Figures.

FIG. 20 shows a detail A of the first embodiment of the trailer from FIG. 16.

DESCRIPTION OF THE FIGURES

Figure 1:
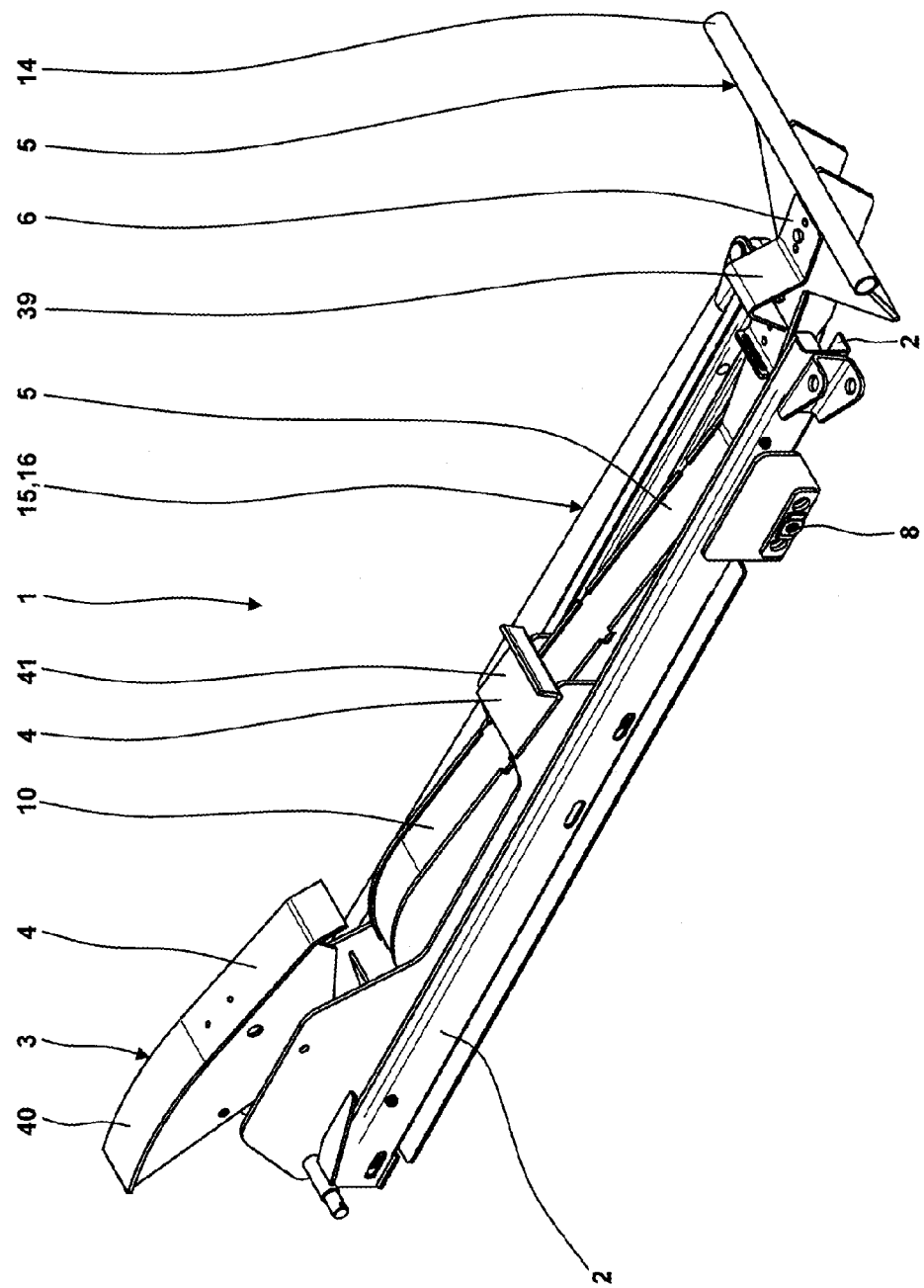
FIG. 1 shows a perspective view of a first exemplary embodiment of a new loading and transport apparatus.
Figure 2:
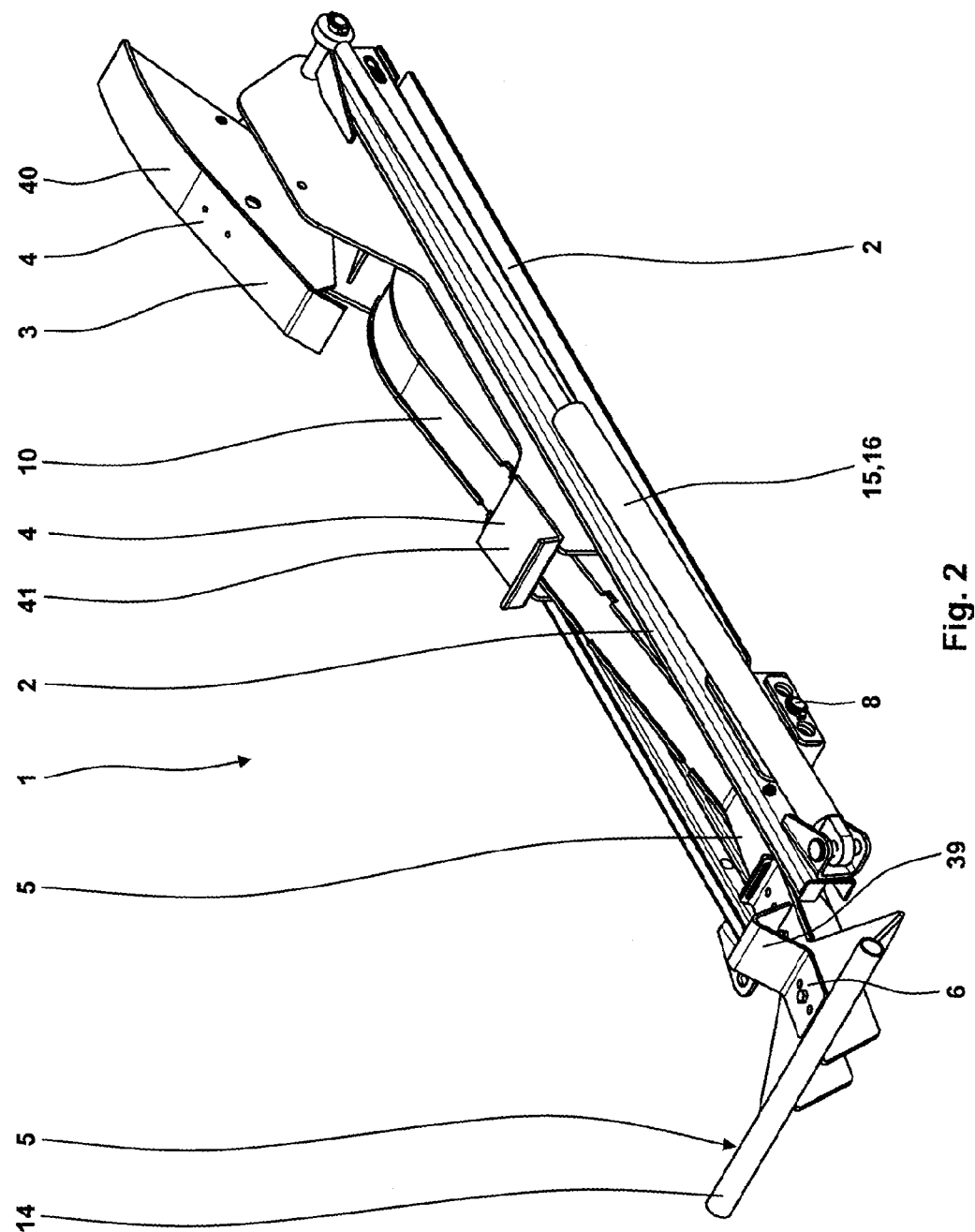
FIG. 2 shows a further perspective view of the first embodiment of the loading and transport apparatus.
Figure 3:
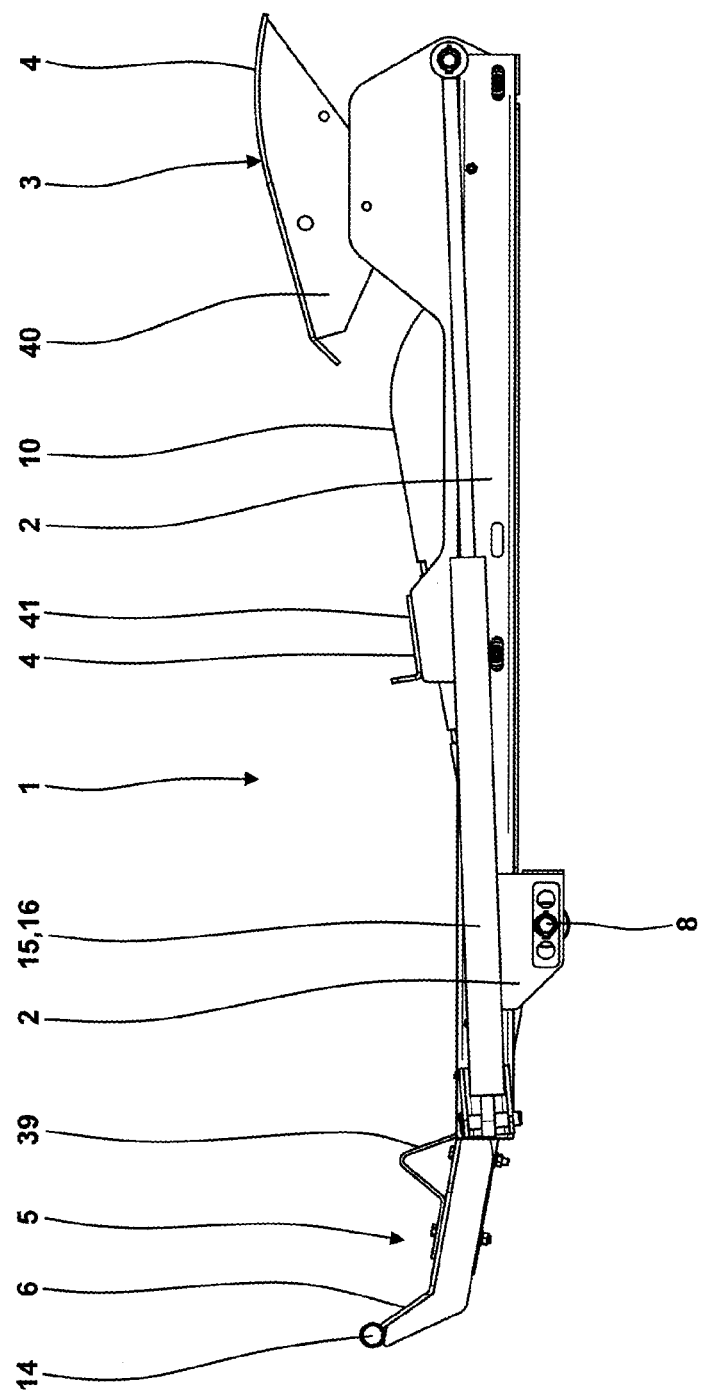
FIG. 3 shows a side view of the first embodiment of the loading and transport apparatus.
Figure 4:
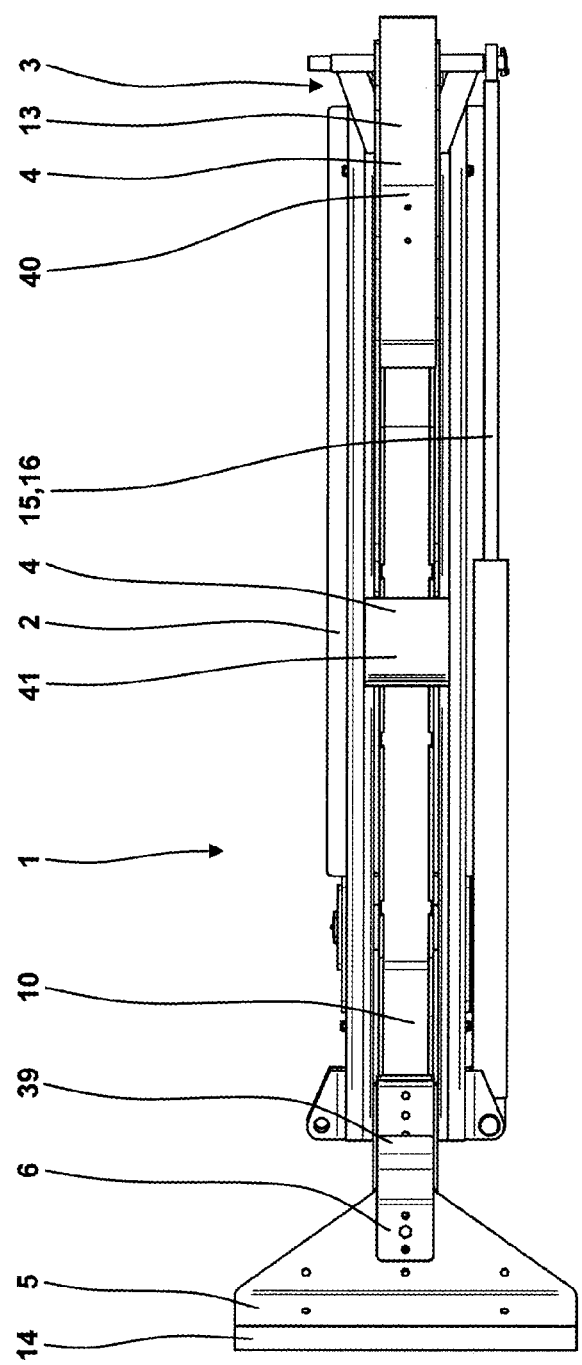
FIG. 4 shows a top view of the first embodiment of the loading and transport apparatus.
Figure 5:
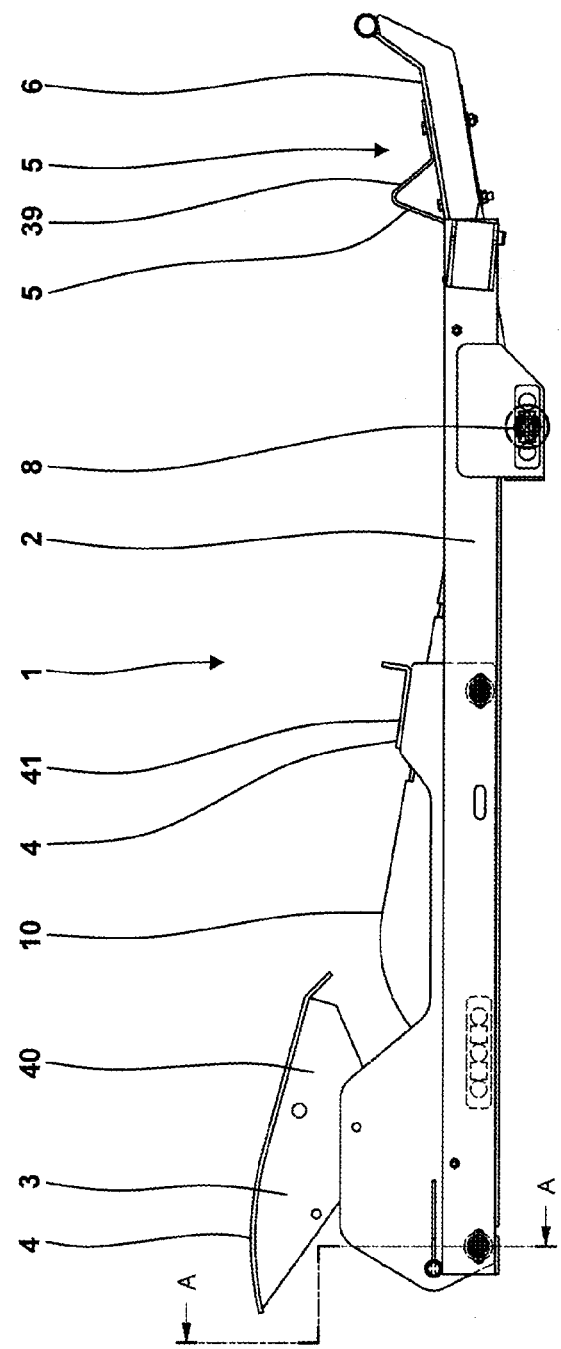
FIG. 5 shows a further side view of the first embodiment of the loading and transport apparatus.

FIGS. 1-6 show various views of a first exemplary embodiment of a new loading and transport apparatus 1 for an agricultural header or implement. The header or implement, which is not shown in these representations, comprises a primary tool and a secondary tool.

The loading and transport apparatus 1 comprises a guide frame 2, which is used for guiding the movable parts of the loading and transport apparatus 1 and which, in its simplest form (not shown here) also can be constituted by a plate-shaped element or another profile.

To the guide frame 2 is arranged a first support device 3 having a first rest surface 4 for receiving the primary tool. The first rest surface 4 can be constituted by one or more parts, whereas it comprises two parts in the exemplary embodiment shown here. In the present example, the first part is constituted by a carriage head 40, which is angularly adjustable. The second part is constituted by an angled plate 41.

The loading and transport apparatus 1 further comprises a second support device 5, arranged on the guide frame 2 and having a second rest surface 6 for receiving the secondary tool. The second rest surface 6 can equally be constituted by one or more parts. The second rest surface 6 comprises a rest plate 39.

Figure 13:
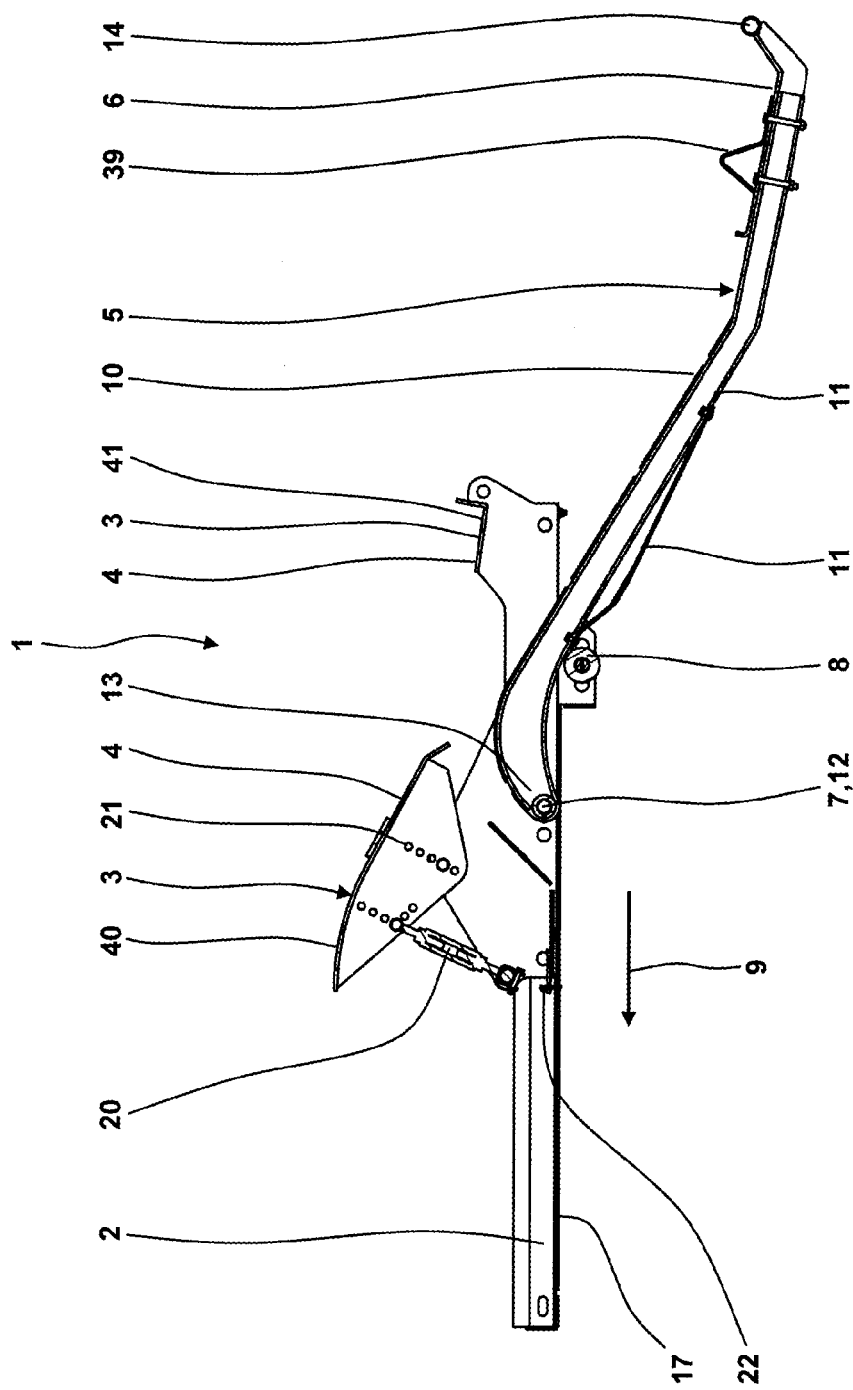
FIG. 13 shows a further side view of the second embodiment of the loading and transport apparatus in the loading position.

To the first support device 3 is arranged a coupling element 7, which connects the first support device 3 to the second support device 5 (see e.g., FIG. 13). Here, the coupling element 7, as an example, is constituted by a linkage bolt 12, which hingeably connects the second support device 5 to the first support device 3. On the guide frame 2 is further arranged a support element 8, which engages the second support device 5, wherein the coupling element 7 and the support element 8 are designed and arranged such that a movement of the first support device 3 in a first direction 9 along the guide frame 2 causes a lifting of the second rest surface 6.

The second support device 5 comprises a support arm 10 having a guide surface 11 (see, e.g., FIG. 13), which contacts the support element 8 such that the geometry of the guide surface 11 defines the direction of movement of the second rest surface 6. Herein, the support arm 10 is supported by the support element 8 and the guide surface 11 slides over the support element 8 as the first support device 3 moves along the support element 8. Herein the movement of the first support device 3 is substantially translational. But also other movement directions are possible.

The support arm 10 comprises a first end 13 and a second end 14, wherein the first end 13 is connected to the first support device 3 and the second end 14 is designed as a free end, the second rest surface 6 being arranged in the proximity of this free end.

The first support device 3 is connected to a drive 15, which, in the embodiment shown, is constituted by a piston-cylinder unit 16. In the mounted condition of the loading and transport apparatus 1, the drive 15 is connected to a motor or engine, possibly through an intermediate transmission, such that the desired movement of the apparatus 1 from the loading position into the transport position and vice versa can be effected by the motor drive. For a plurality of apparatuses 1, all or only some of them may comprise a drive 15. The apparatuses 1 without their own drive 15 then are moved along with the others.

Figure 6:
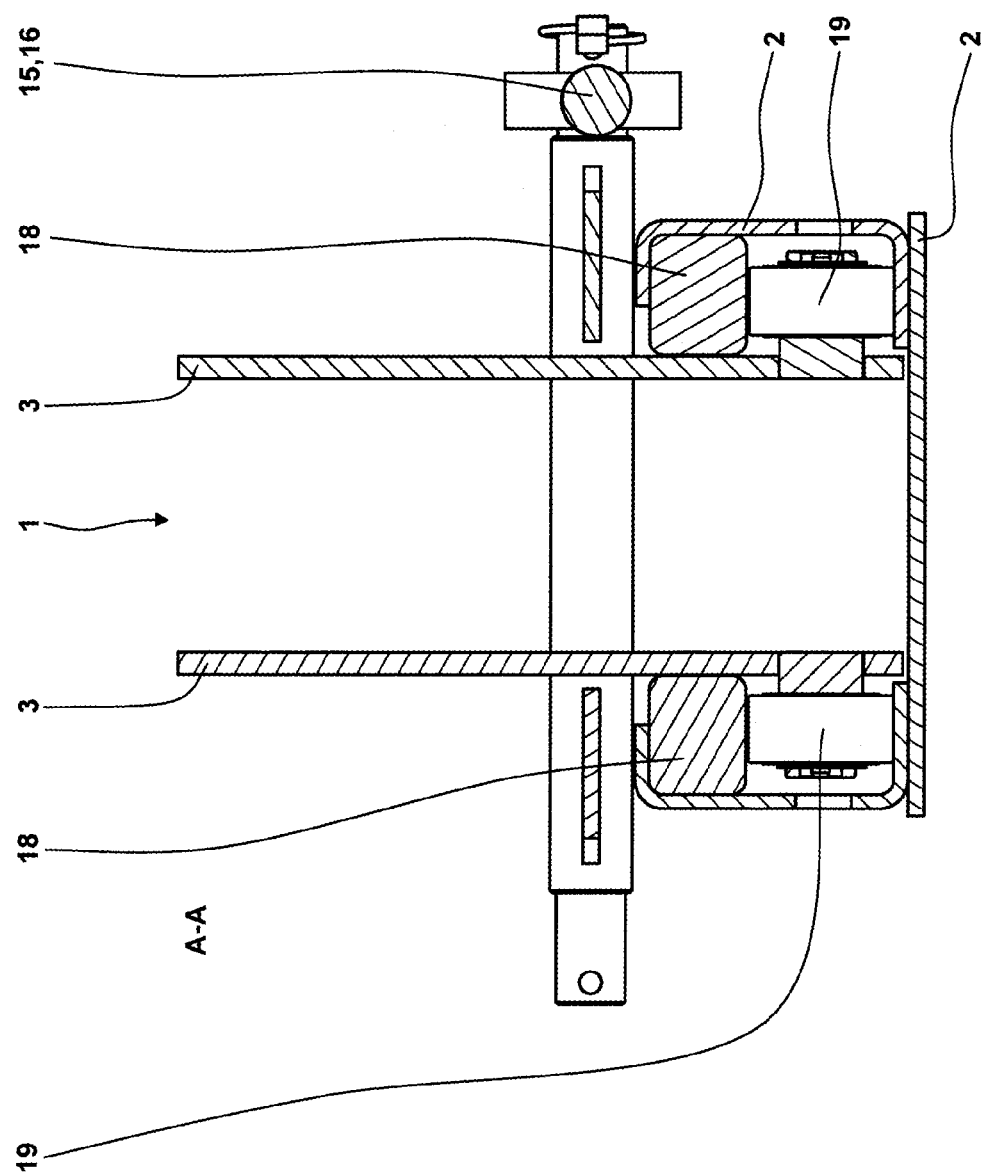
FIG. 6 shows a sectional view of the first embodiment of the loading and transport apparatus along line A-A in FIG. 5.
Figure 7:
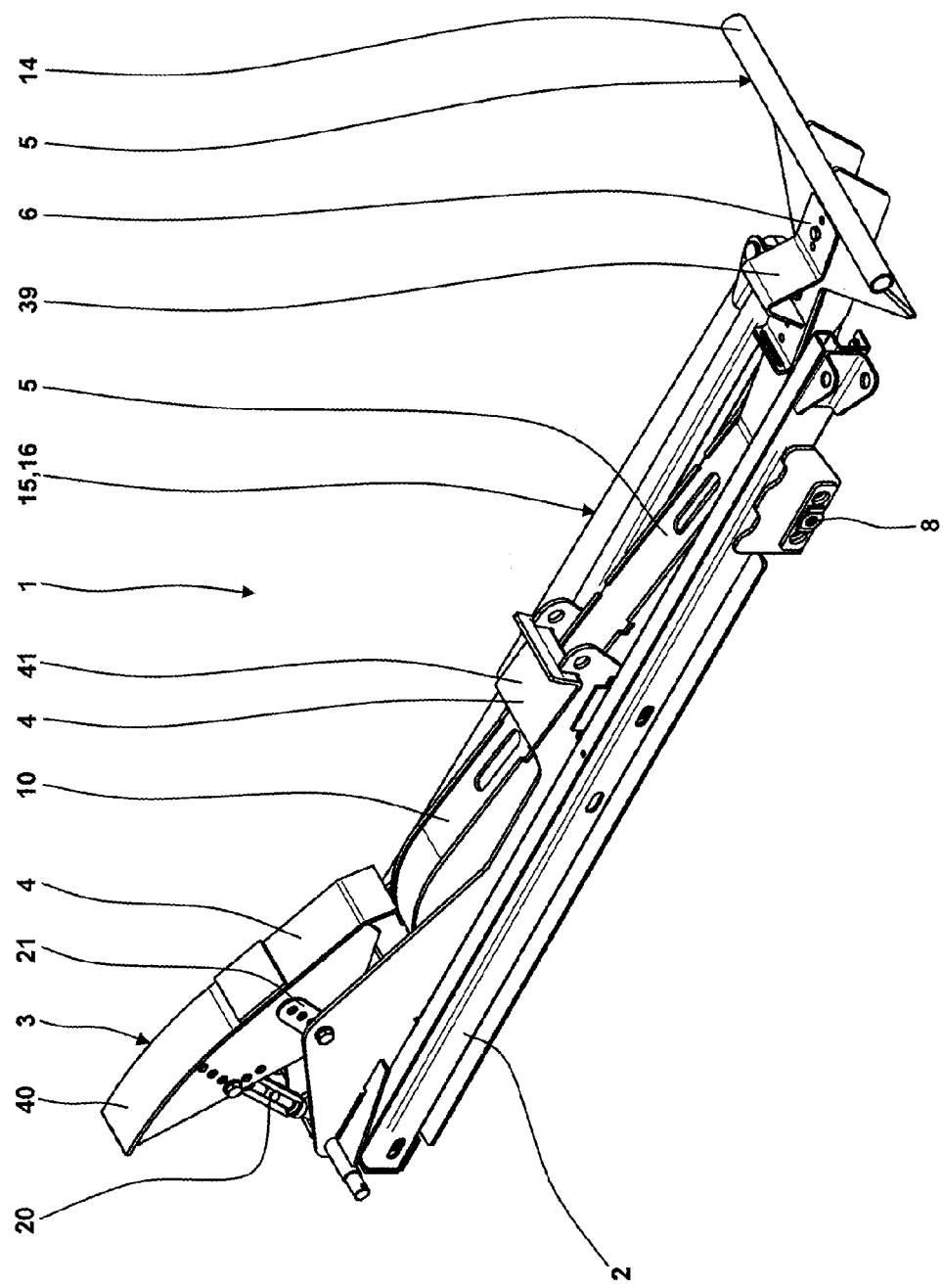
FIG. 7 shows a perspective view of a second exemplary embodiment of the new loading and transport apparatus.
Figure 8:
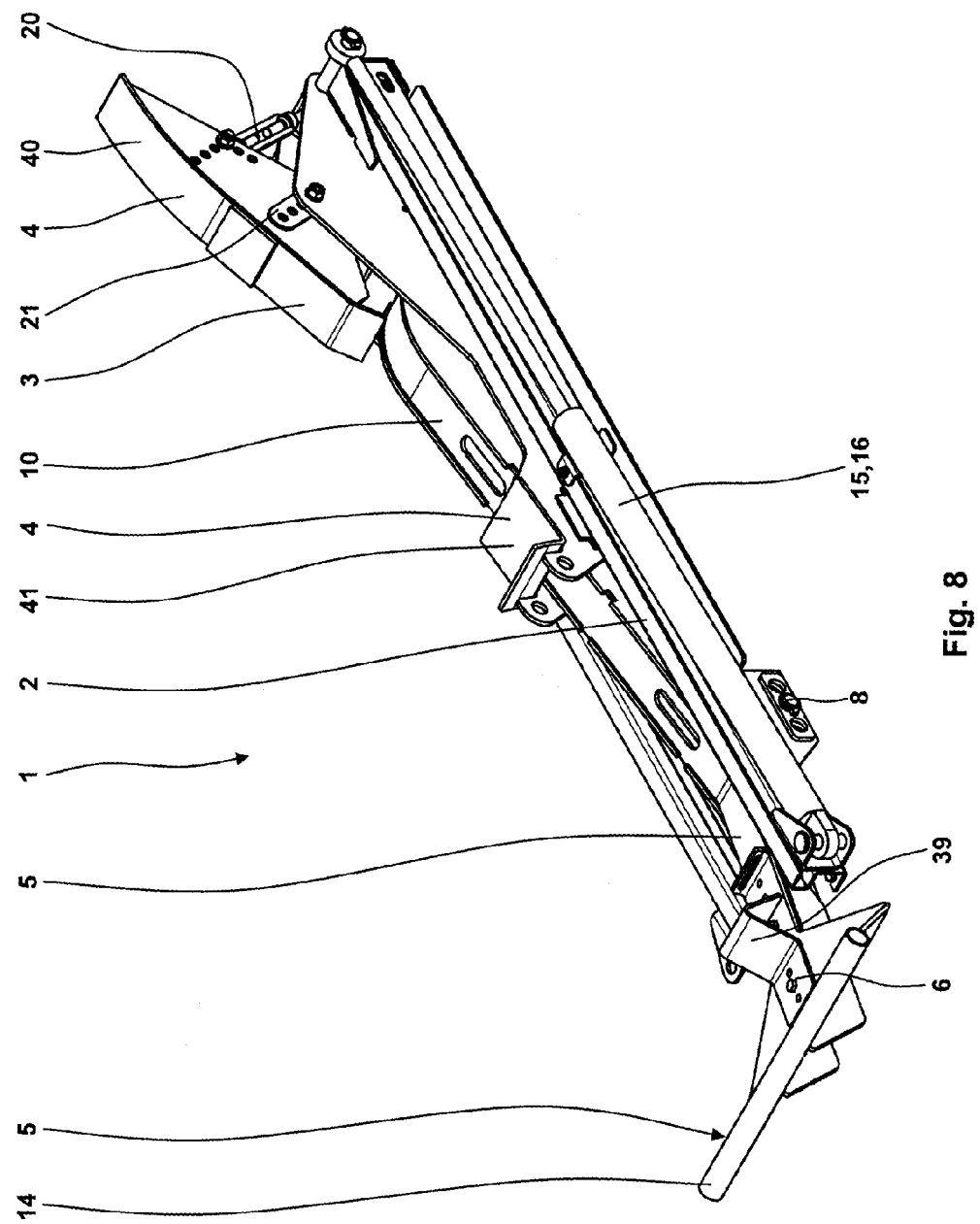
FIG. 8 shows a further perspective view of the second embodiment of the loading and transport apparatus.
Figure 9:
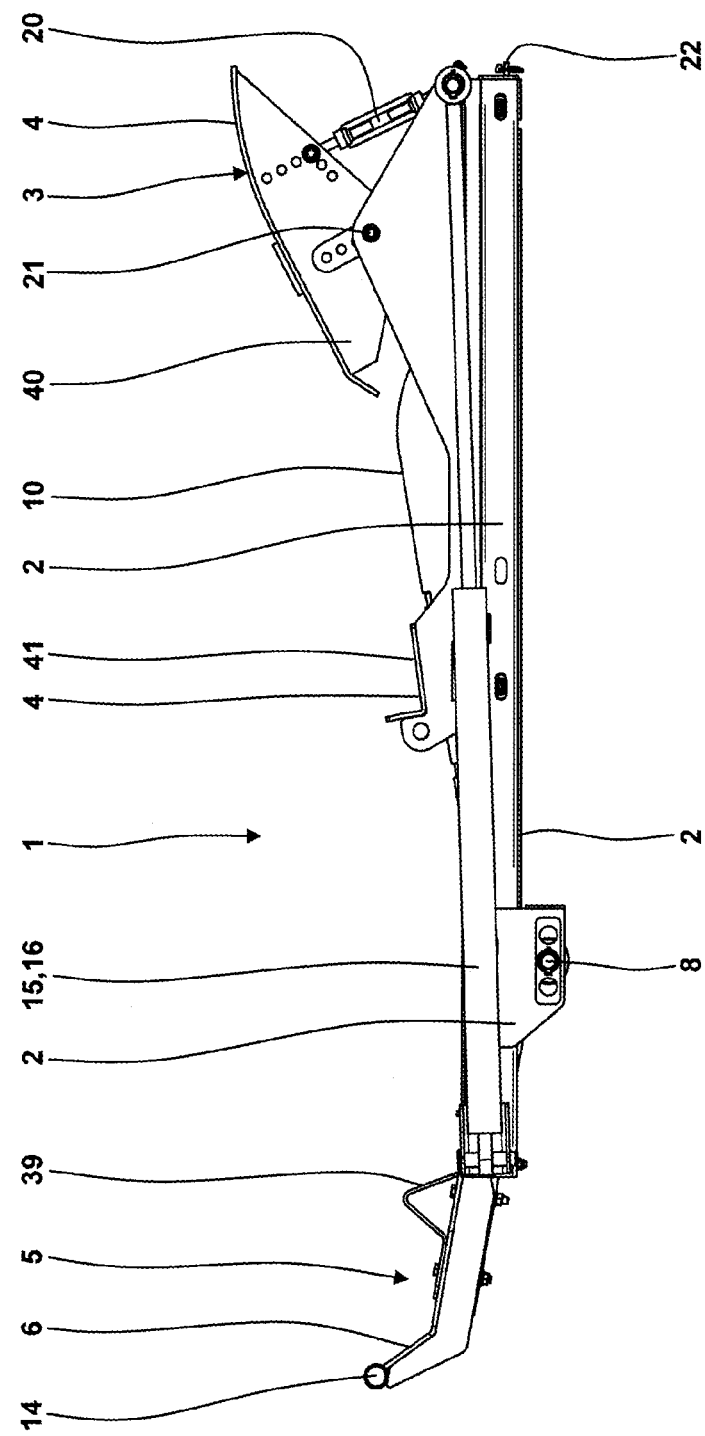
FIG. 9 shows a side view of the second embodiment of the loading and transport apparatus.
Figure 10:
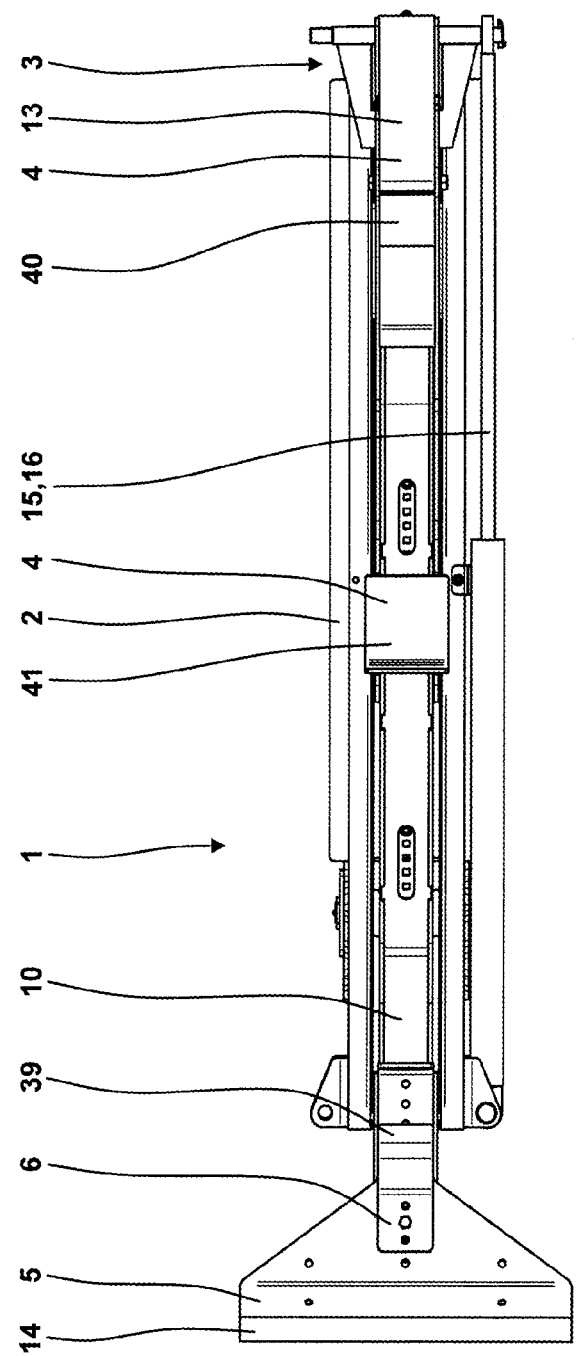
FIG. 10 shows a top view of the second embodiment of the loading and transport apparatus.
Figure 11:
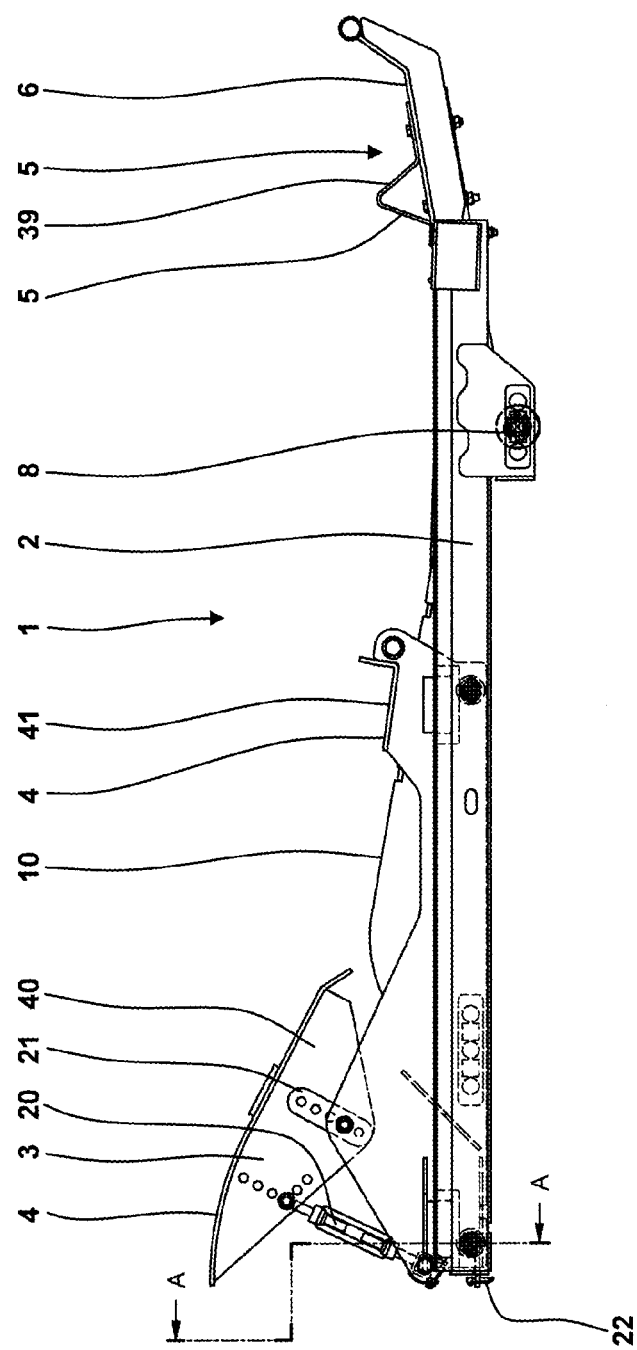
FIG. 11 shows a further side view of the second embodiment of the loading and transport apparatus.

The type of mounting of the loading and transport apparatus 1 as well as the constitution of the guide frame 2 are particularly well recognizable in the sectional representation according to FIG. 6. The guide frame 2 comprises in its lower region a bottom plate 17, which is closed in the region shown. However, the bottom plate 17 preferably is not closed in other areas, in order to allow for the passage of movable parts of the apparatus 1 during their movement. The guide frame 2 otherwise has a substantially U-shaped form. Here, on both sides, elongate guide rails 18 are immovably arranged in the upper region of the U-shape, along which rails the first support device 3 slide during the movement of the movable parts of the loading and transport apparatus 1. In particular, the guide rails 18 may be constituted by synthetic material. The first support device 3 has in its lower region, on both sides, rollers 19, which lie down in the lower region of the U-shaped section of the guide frame 2, roll over the same and thereby enable the movement of the first support device 3 relative to the guide frame 2. It is clear that at least one further roller pair is provided at a distance in the longitudinal direction from the roller 19.

The position of the support element 8 as well as the position of the coupling element 7 on the guide frame 2 is adjustable by means of various combinations of screws, possibly nuts, and/or corresponding holes, slots, in particular spaced holes. Also the distance between the first end 13 of the support arm 10 and the second rest surface 6 is adjustable. Furthermore, the position of the second rest surface 6, which is arranged in the region of the V-shaped rest plates 39, is adjustable.

FIGS. 7-12 show comparable representations of a second exemplary embodiment of the new loading and transport apparatus 1. This embodiment has many features in common with the first exemplary embodiment, such that with respect to the common features reference is made to the explanations above.

In contrast thereto, the first support device 3 comprises a turnbuckle 20. The turnbuckle 20 is used for the optional adjustment, in particular fixation, of the attack angle of the first support device 3. The support device 3 thus is mounted pivotably, such that its attack angle can be adjusted, in particular varied and secured by means of the turnbuckle 20. Furthermore, the first support device 3 comprises an adjustment means 21, by which a plurality of distinct positions of the first support device 3 can be set.

In addition a securing element 22 is provided, by means of which the first support device 3 can be fixed in the transport position, for effectively preventing an unwanted movement in the direction of the loading position.

Figure 12:
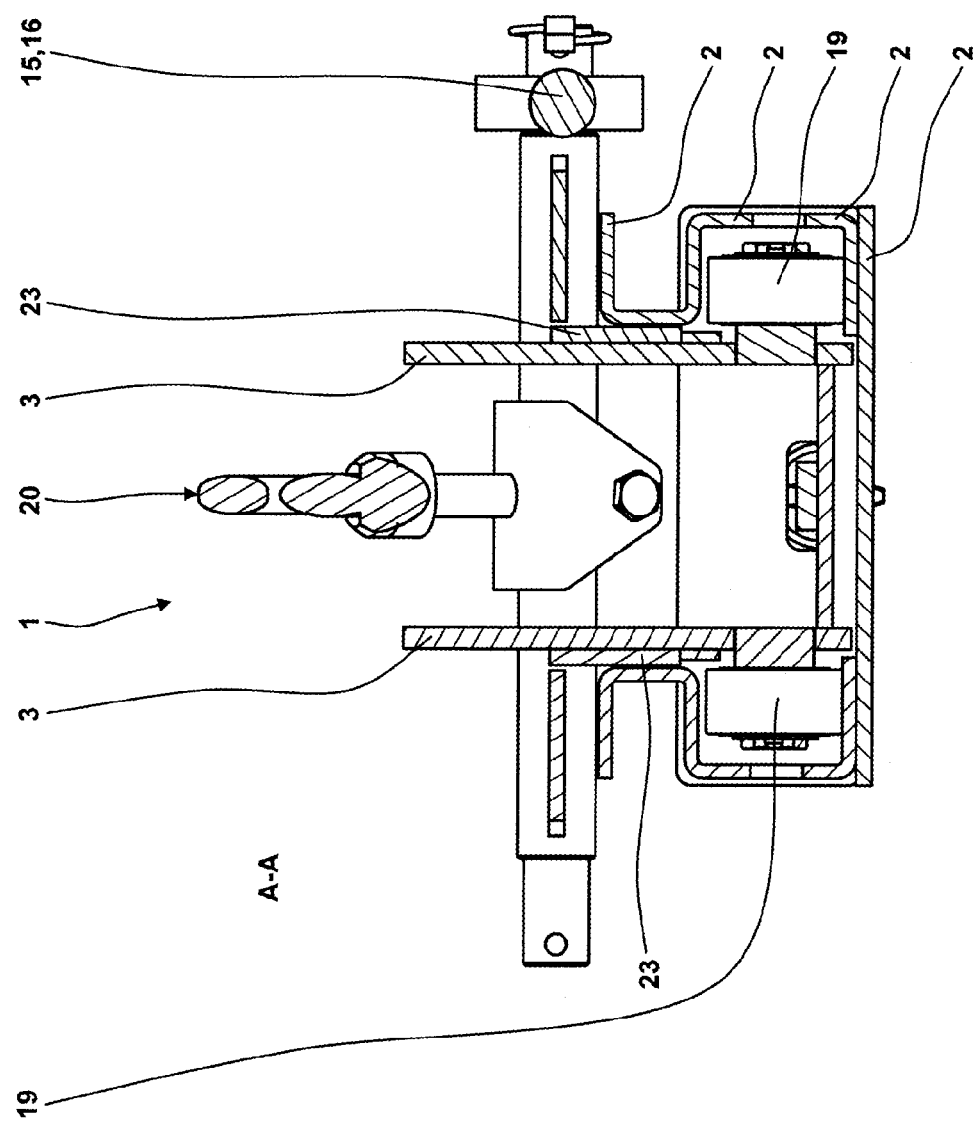
FIG. 12 shows a sectional view of the second embodiment of the loading and transport apparatus along line A-A in FIG. 11.

Here, the structure of the guide frame 2 and the way the movable parts of the loading and transport apparatus 1 are guided in the guide frame 2 are solved otherwise, as can be seen particularly well in FIG. 12. Apart from the bottom plate 17, the guide frame 2 has no U-shape here, but rather a double U-shape, in particular a Z-shape. Instead of the elongate stationary guide rails 18 (see FIG. 6) concurrently moved guide elements 23 are provided, which are attached to the first support device 3 and slide along the interior of the guide frame 2.

Figure 14:
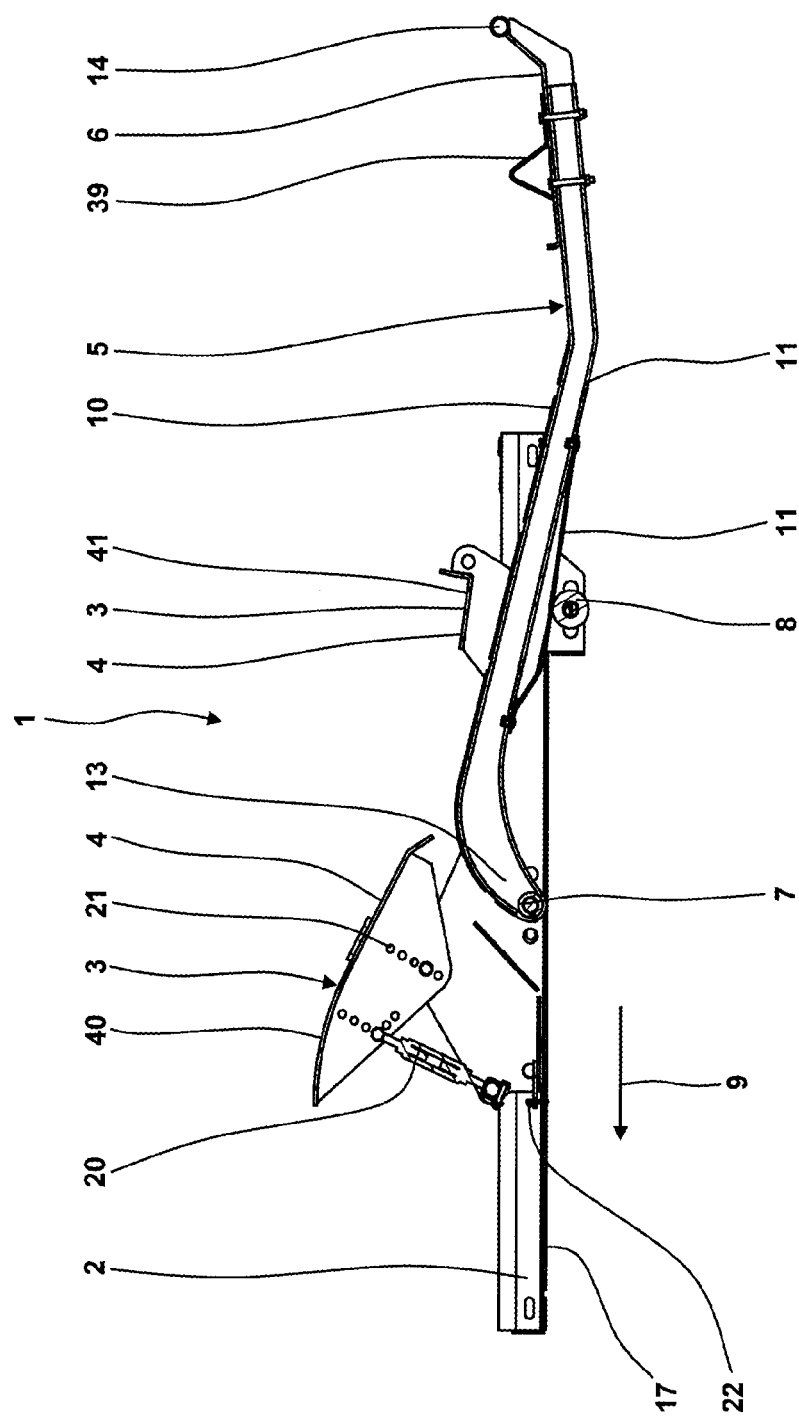
FIG. 14 shows a further side view of the second embodiment of the loading and transport apparatus in an intermediate position.
Figure 15:
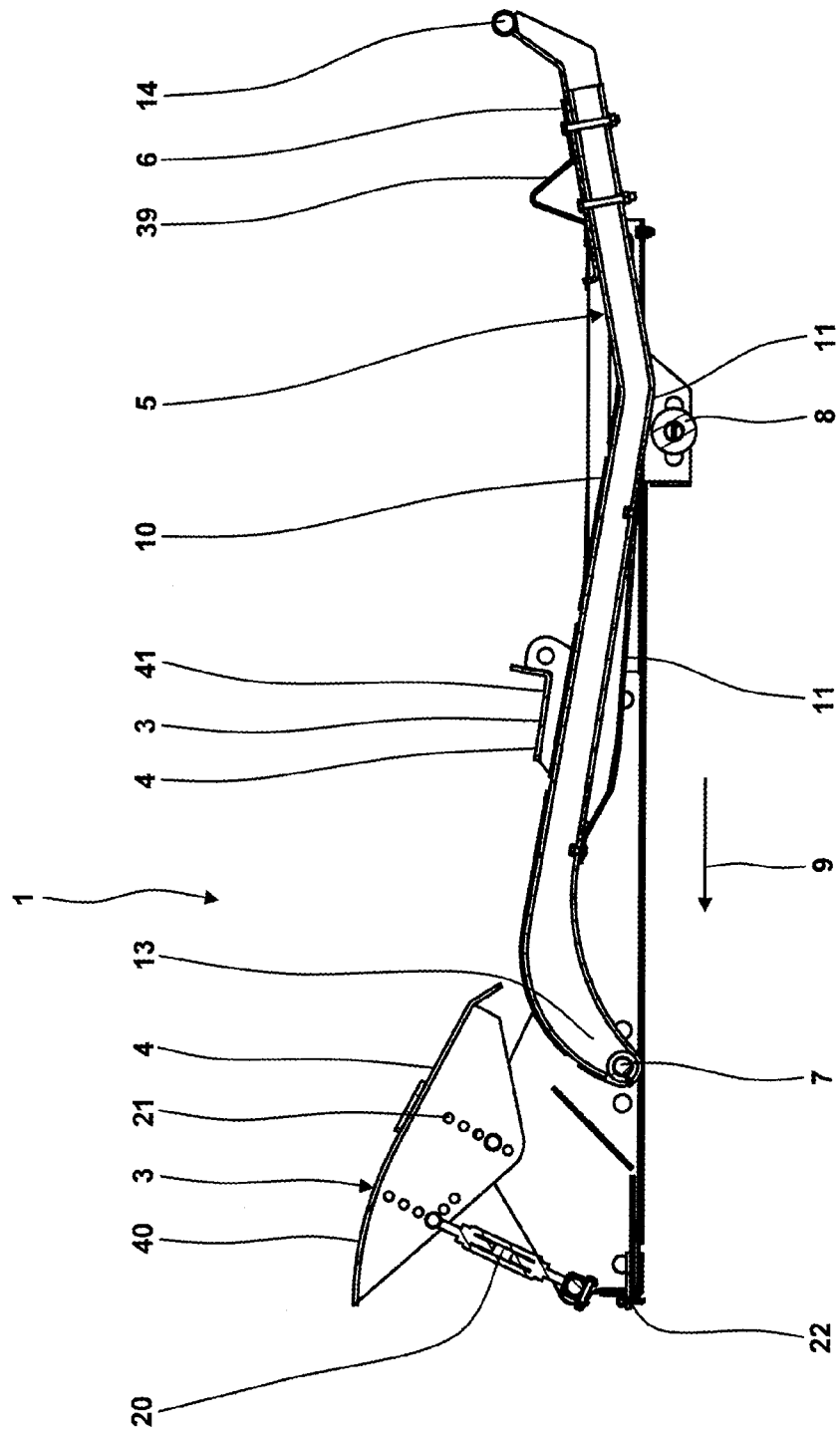
FIG. 15 shows a further side view of the second embodiment of the loading and transport apparatus in the transport position.
Figure 16:
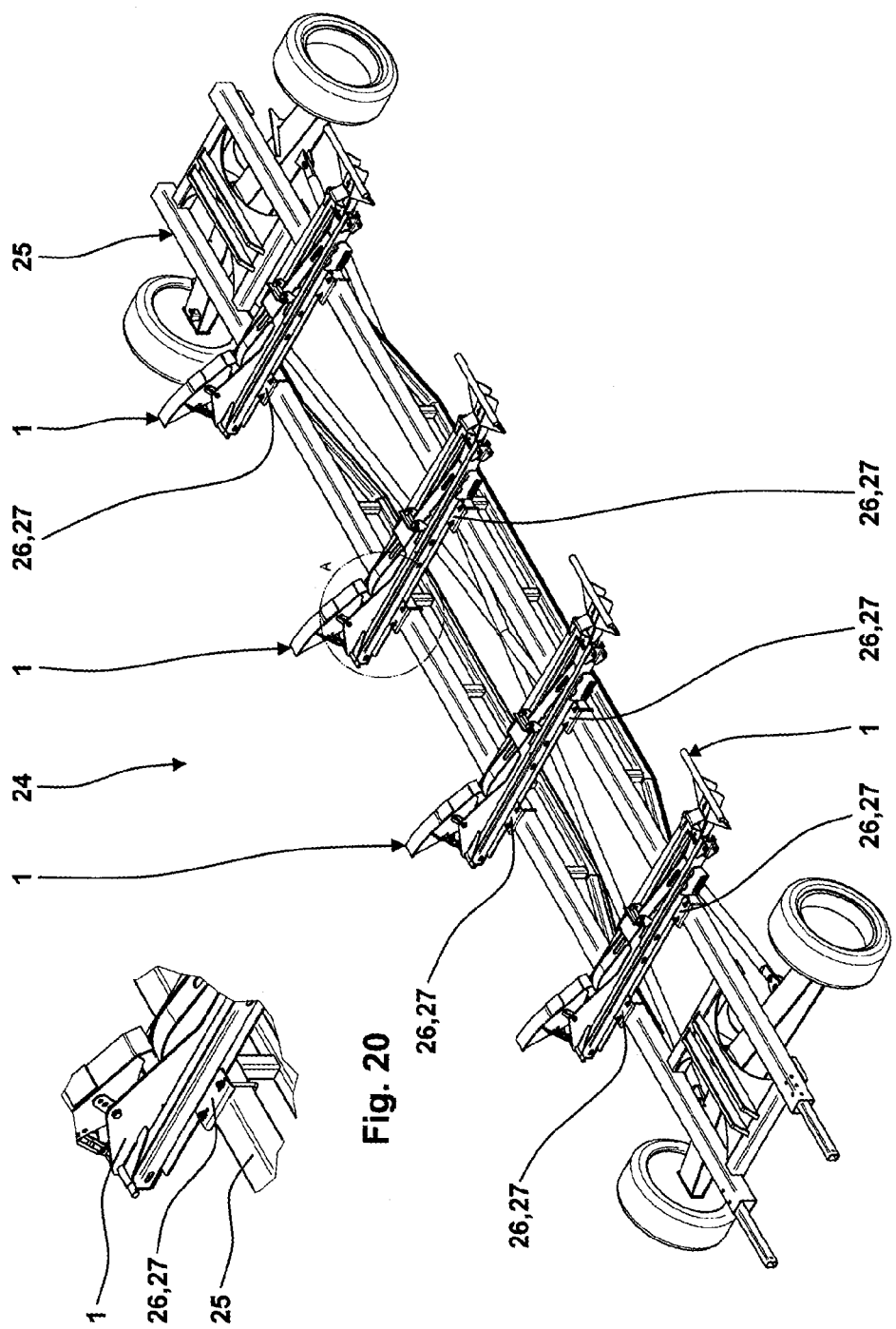
FIG. 16 shows a perspective view of a first exemplary embodiment of a new trailer comprising a plurality of new loading and transport apparatuses according to the second embodiment.
Figure 17:
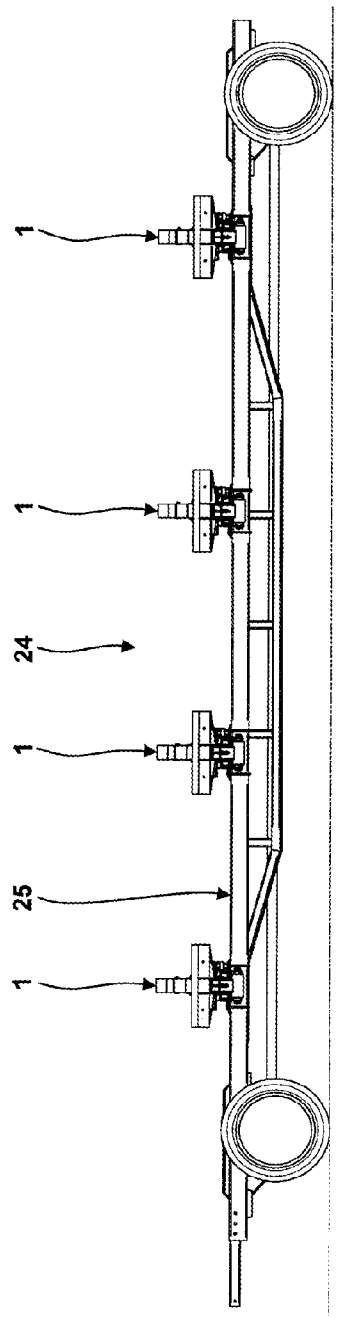
FIG. 17 shows a side view of the first embodiment of the trailer.
Figure 19:
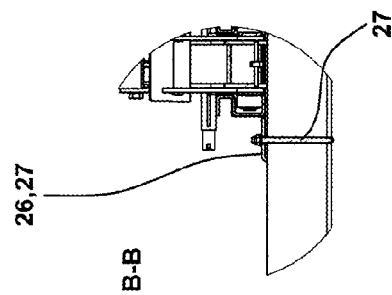
FIG. 19 shows a sectional view of the first embodiment of the trailer along line B-B in FIG. 18.
Figure 18:
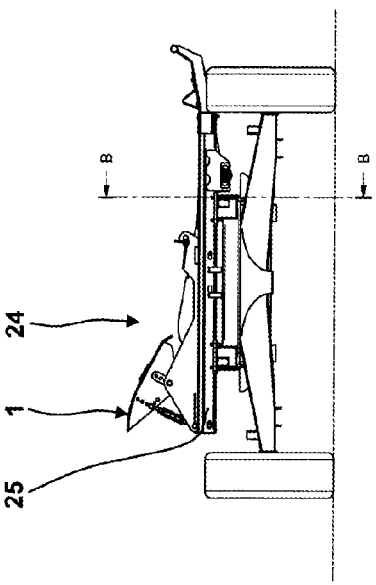
FIG. 18 shows a front view of the first embodiment of the trailer.

FIGS. 13, 14 and 15 now clearly show the new structure and the new functionality of the loading and transport apparatus 1. Herein one and the same loading and transport apparatus 1 is represented in distinct positions. Starting from the loading position shown in FIG. 13, the movable parts of the loading and transport apparatus 1 are moved in FIGS. 14 and 15 always further in the first direction 9. FIG. 14 therein shows an intermediate position, while FIG. 15 represents the transport position of the loading and transport apparatus 1.

As shown in FIG. 13, in the loading position the first support device 3 takes a comparably far right position relative to the guide frame 2. The second support device 5, which is connected to the first support device 3, is also located accordingly in a comparably far right position, wherein this position additionally is lowered. The second end 14 of the support arm 10 is also in its lowermost position. In this loading position it is now possible to put an agricultural header or implement onto the loading and transport apparatus 1, as will described below in greater detail with reference to FIGS. 22-24.

Figure 25:
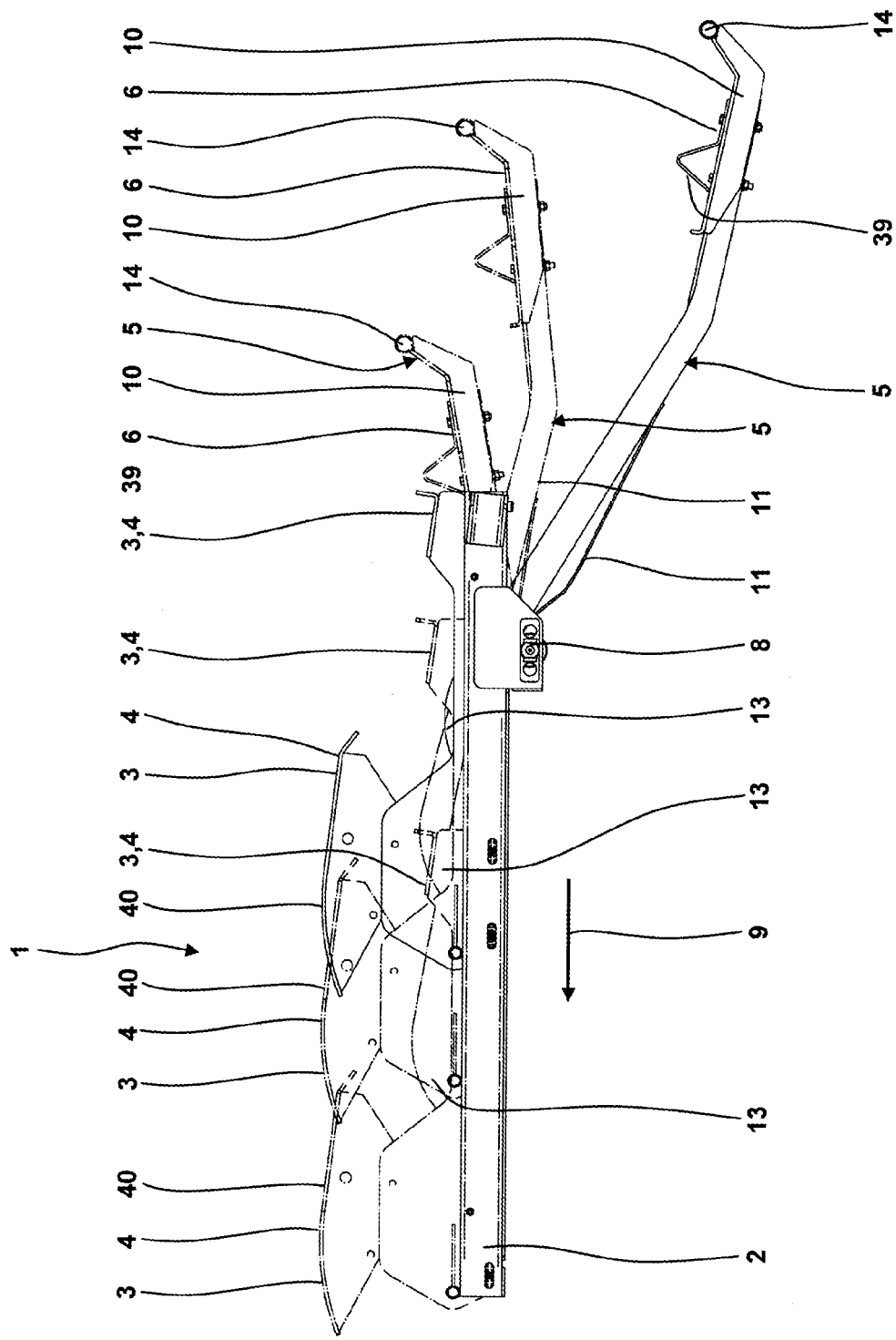
FIG. 25 shows a side view of a further exemplary embodiment of the loading and transport apparatus comprising a simultaneous representation of the loading position, an intermediate position and the transport position.

Both end positions of the loading and transport apparatus 1 as well as an intermediate position are also represented in FIG. 25, which facilitates the comparison between the positions by the simultaneous representation of the loading position in full lines, and the additional representation of the intermediate position and the transport position in phantom lines.

When the first support device 3 is moved relative to the guide frame 2 in the first direction 9, the second support device 5 will be moved along by the coupling element 7, which connects the support devices 3, 5. The part of the second support device 5 that forms support arm 10, slides with its guide surface 11 along the support element 8, whereby the geometry of the guide surface 11 actually defines the direction of movement of the second rest surface 6. Herein, the geometry is chosen such that in a superimposed movement, the second rest surface 6 is moved along in the first direction 9 and simultaneously upward. So, in a manner, which can be more or less freely defined, the substantially translational movement of the first support device 3 is also converted into a lift movement, such that the second rest surface 6, which supports the secondary tool, is lifted and provides, in the transport position according to FIG. 15, a secure support of the header or implement by the loading and transport apparatus 1 during transport operations. The guide surface 11 may also be defined by the profile of the support arm 10 itself or, e.g., by further guide elements, in particular guide plates, which may be attached at distinct positions and have distinct geometries to the support arm 10.

FIGS. 16-20 now show various views of a first exemplary embodiment of a new trailer 24 for loading and transporting an agricultural header or implement that comprises a primary tool and a secondary tool. Herein, the trailer 24 comprises a plurality of loading and transport apparatuses 1. For the details of the loading and transport apparatus 1 reference is made to the explanation above.

The trailer 24 comprises a frame 25 and the further usual components of a trailer 24 as shown in the Figures. As is clearly shown in particular in FIG. 20, each of the apparatuses 1 is attached to the frame 25 of the trailer 24 without using holes. Here, the attachment without holes is realised by clamping elements 27 which are constituted by clamps 26. In this manner the distance between the single apparatuses 1 can be adjusted variably without steps. Also the distance between facing clamping elements 27 on one and the same apparatus 1 can be variably set, such that the apparatus 1 can be universally attached to distinct trailers 24.

Figure 21:
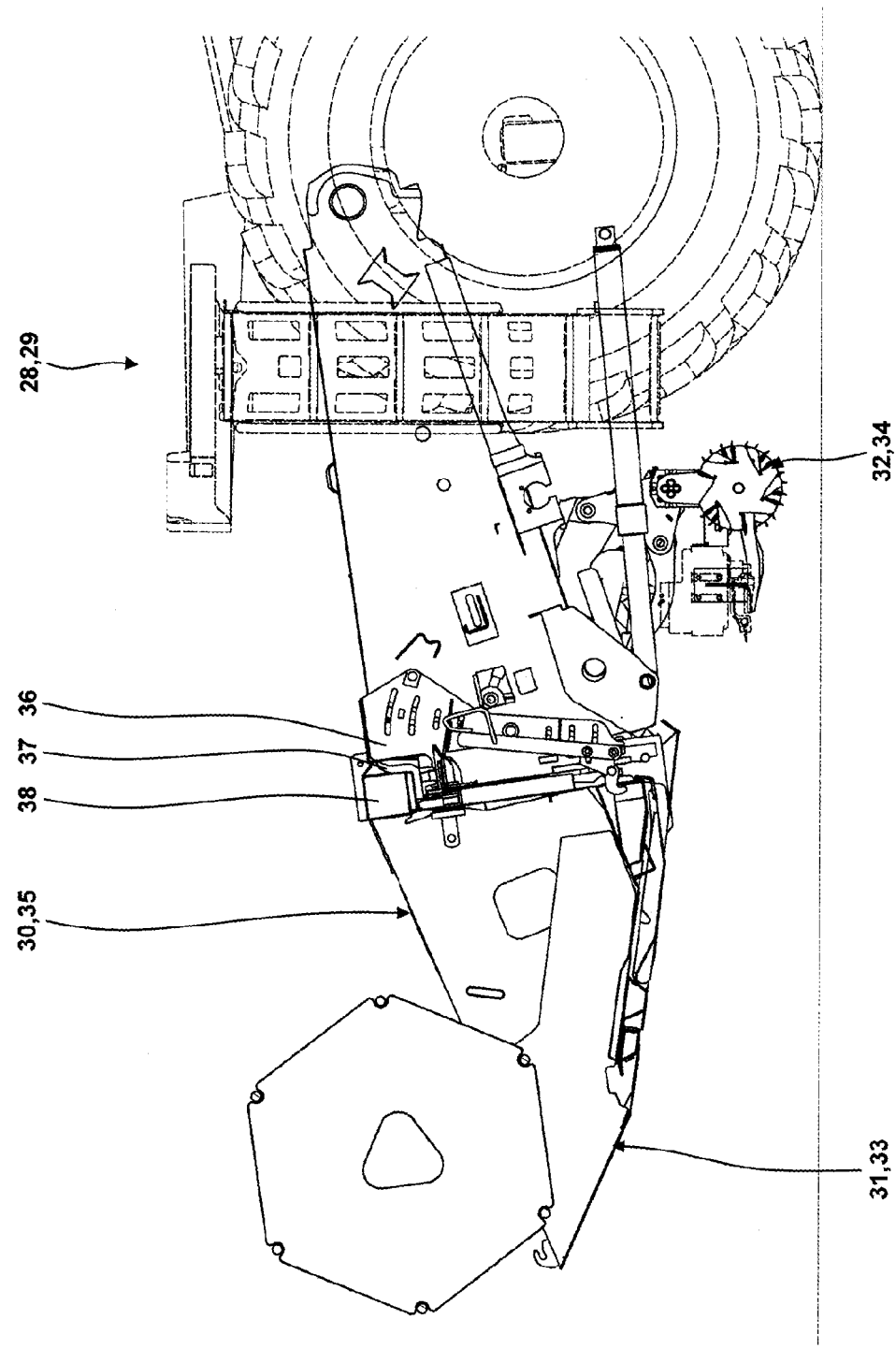
FIG. 21 shows a side view of a first exemplary embodiment of a utility vehicle equipped with a header.

FIG. 21 illustrates an exemplary embodiment of a utility vehicle 28, which here is constituted by a combine harvester 29. However, it may also relate to another type of utility vehicle 28. In this case, the utility vehicle 28 comprises a header 30. However, it may also concern an implement instead. The header 30 comprises a primary tool 31 and a secondary tool 32. Here, the primary tool 31 comprises the main cutting device 33 of the combine harvester 29. The secondary tool 32 here comprises a secondary cutting device 34 of the combine harvester 29. The latter is used for cutting and chopping the relatively long stubble stalks, which are left behind by the main cutting device 33. Both cutting devices 33, 34 are part of the header 35 of the combine harvester 29. During operation of the combine harvesters 29, the header 35 is attached thereto, but has to be detached therefrom for the road transport of the combine harvester 29. The combine harvester 29 therefore is provided with an elevator front adapter 36 having a trough shaped element 37. The header 35 further has a coupling element 38, which in the mounted position is received in the trough shaped element 37.

Figure 22:
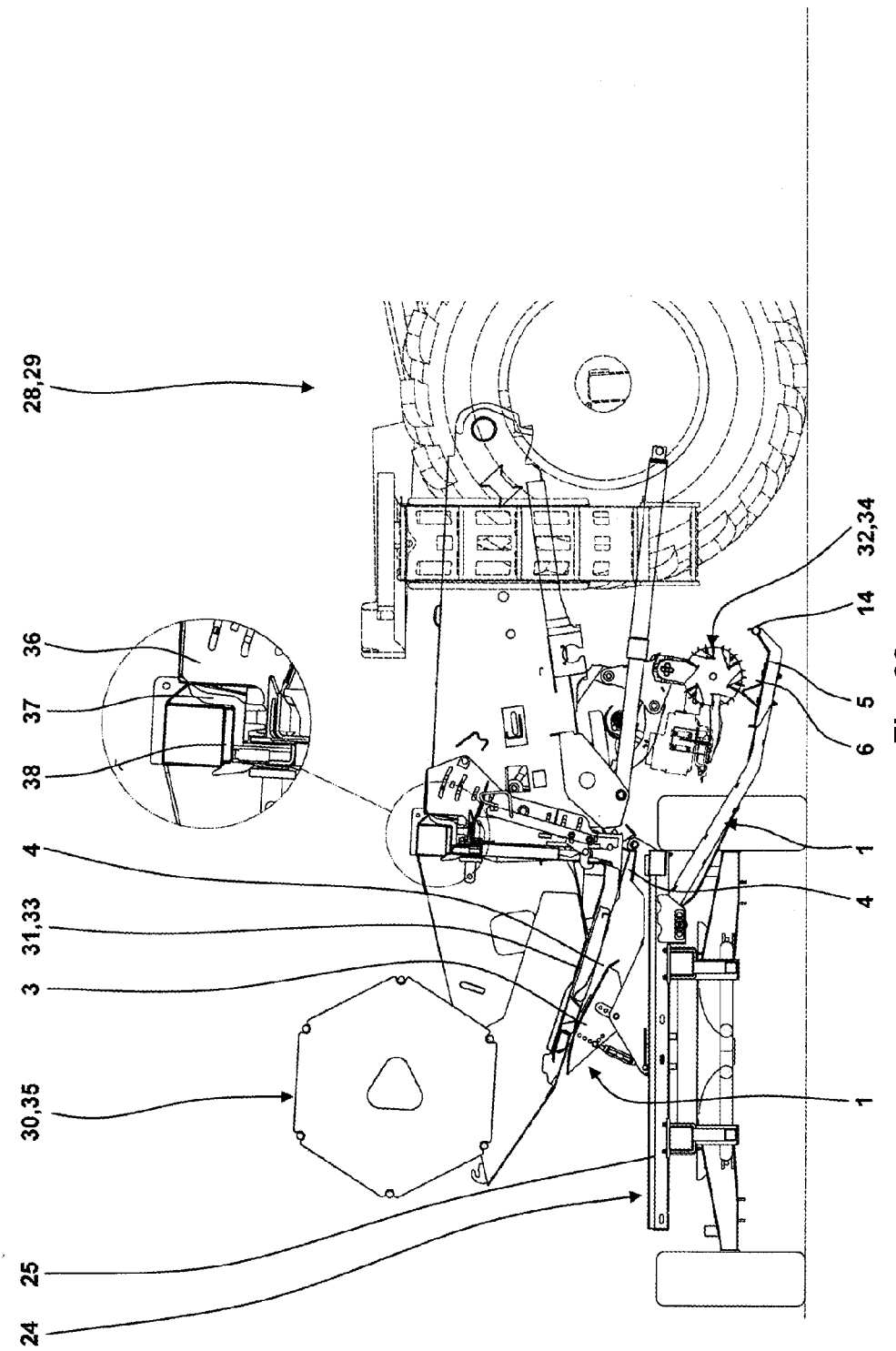
FIG. 22 shows the first embodiment of the utility vehicle at the start of the loading of the header onto a first embodiment of the trailer.

In the view of FIG. 22 the apparatuses 1, which are mounted onto the trailer 24, are located in their loading position. The header 35 of the combine harvester 29 is in its coupled position. The second support device 15 is arranged at a level, such that the lowest point of the header 30—actually the lower end of the secondary cutting device 34—can be lead in a horizontal direction adjacent the second end 14 of the support arm 10, without contacting the same. Instead, a desired contact is realised between the first rest surface 4 of the first support device and the main cutting device 33 of the header 35. In other words, in this position the header 35 is placed onto the plurality of loading and transport apparatuses 1 of the trailer 24.

Figure 23:
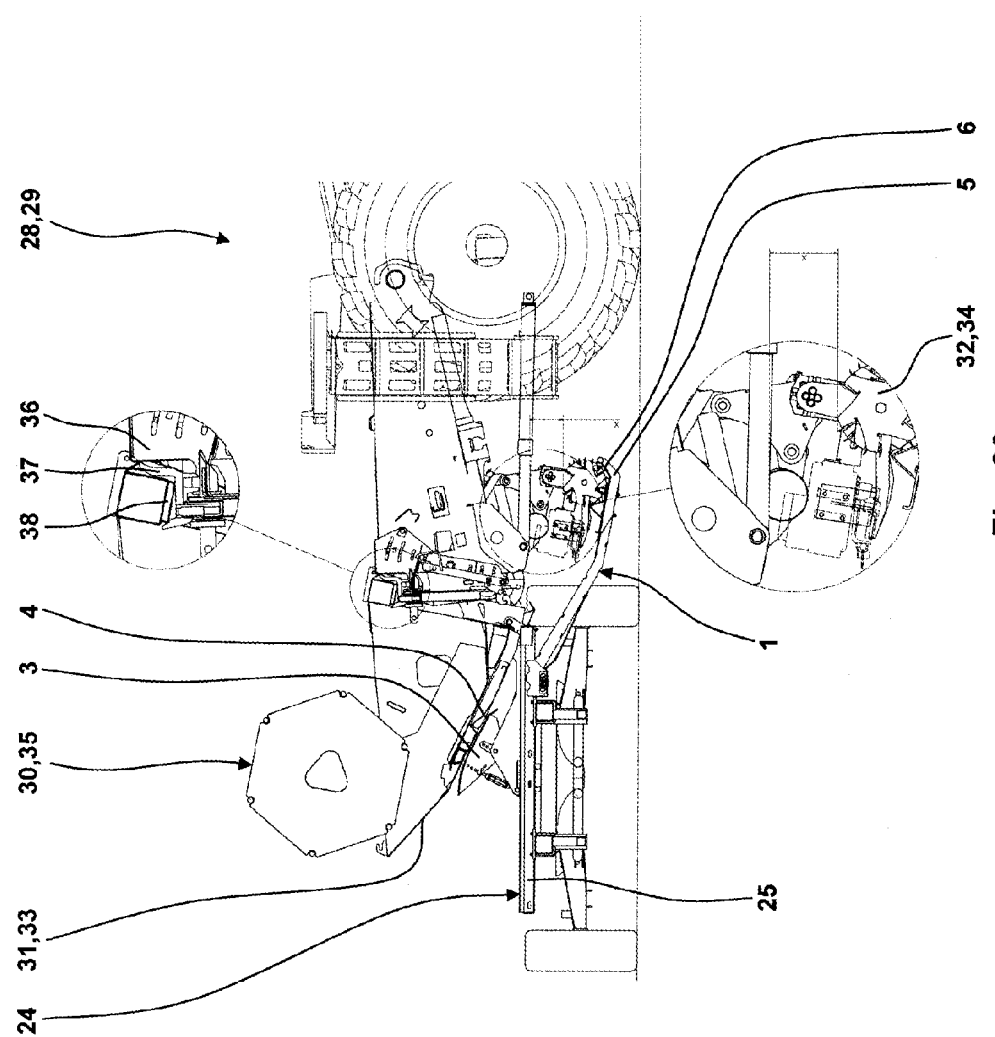
FIG. 23 shows the first embodiment of the utility vehicle during the loading of the header onto a first embodiment of the trailer at a later time than in FIG. 22.

Then follows the transition to the position shown in FIG. 23. This Figure illustrates the start of the disconnection operation between the header 35 and the remaining combine harvester 29, wherein the secondary tool 32 now also is resting on the assigned second rest surface 6 of the second support device 5. In order to carry on the disconnection operation, the elevator front adapter 36 is lowered further, such that the trough shaped element 37 and the coupling element 38 separate from one another. The lowest point of the elevator front adapter 36 then takes a position that is a predetermined distance higher than the highest point of the header 35, in particular of the secondary cutting device 34. Thereby the combine harvester 29 can be driven rearwardly from the trailer 24, as illustrated shown in FIG. 24.

Figure 24:
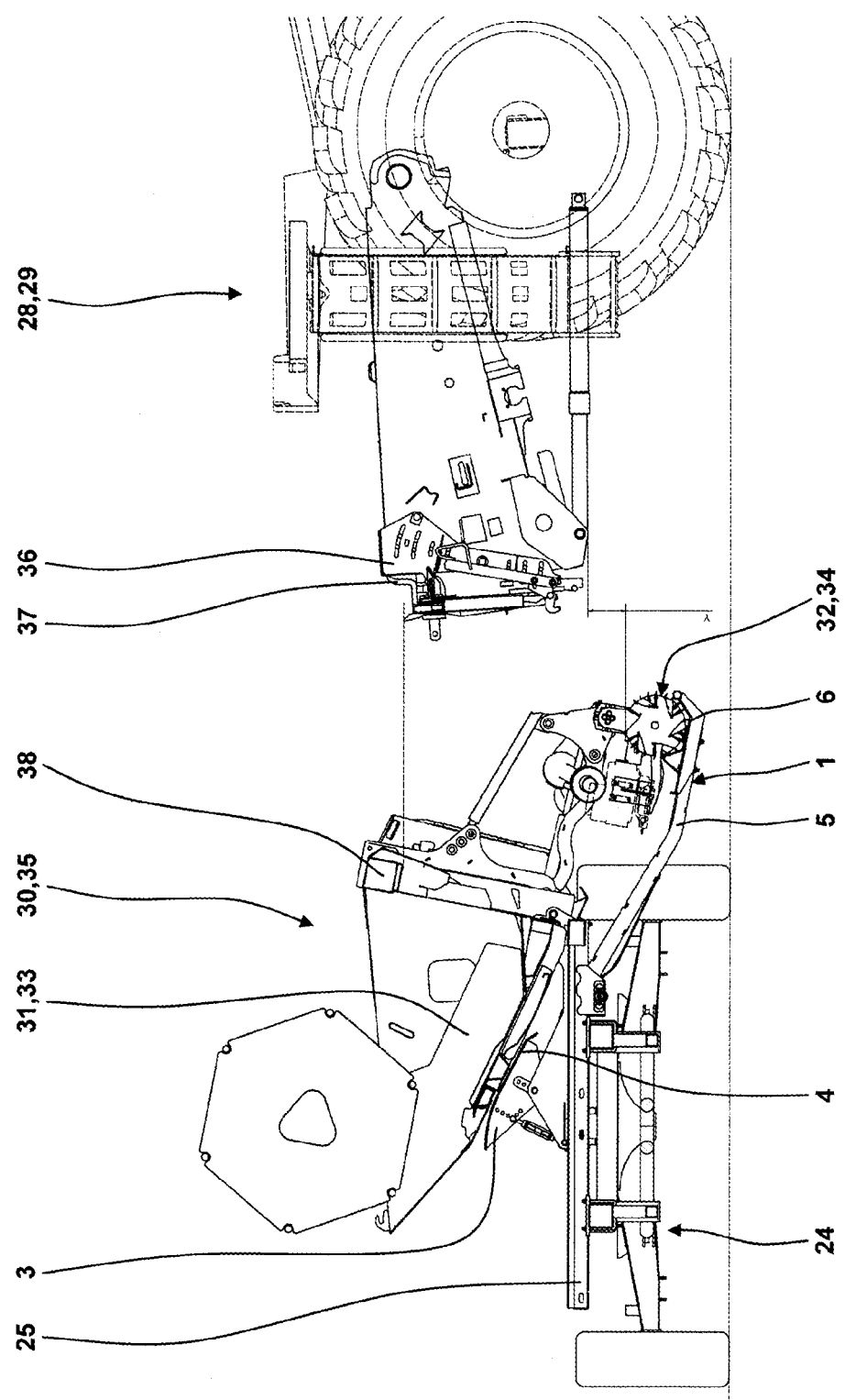
FIG. 24 shows a side view of the first embodiment of the utility vehicle with a detached header, wherein the header is positioned in the loading position on the trailer.

Concurrently, the loading and transport apparatuses 1 on the trailer 24 are transferred from the loading position according to FIG. 24 or also from the full line position shown in FIG. 25 into the transport position, in which the header 35 can be transported while securely resting on the trailer 24.

Figure 26:
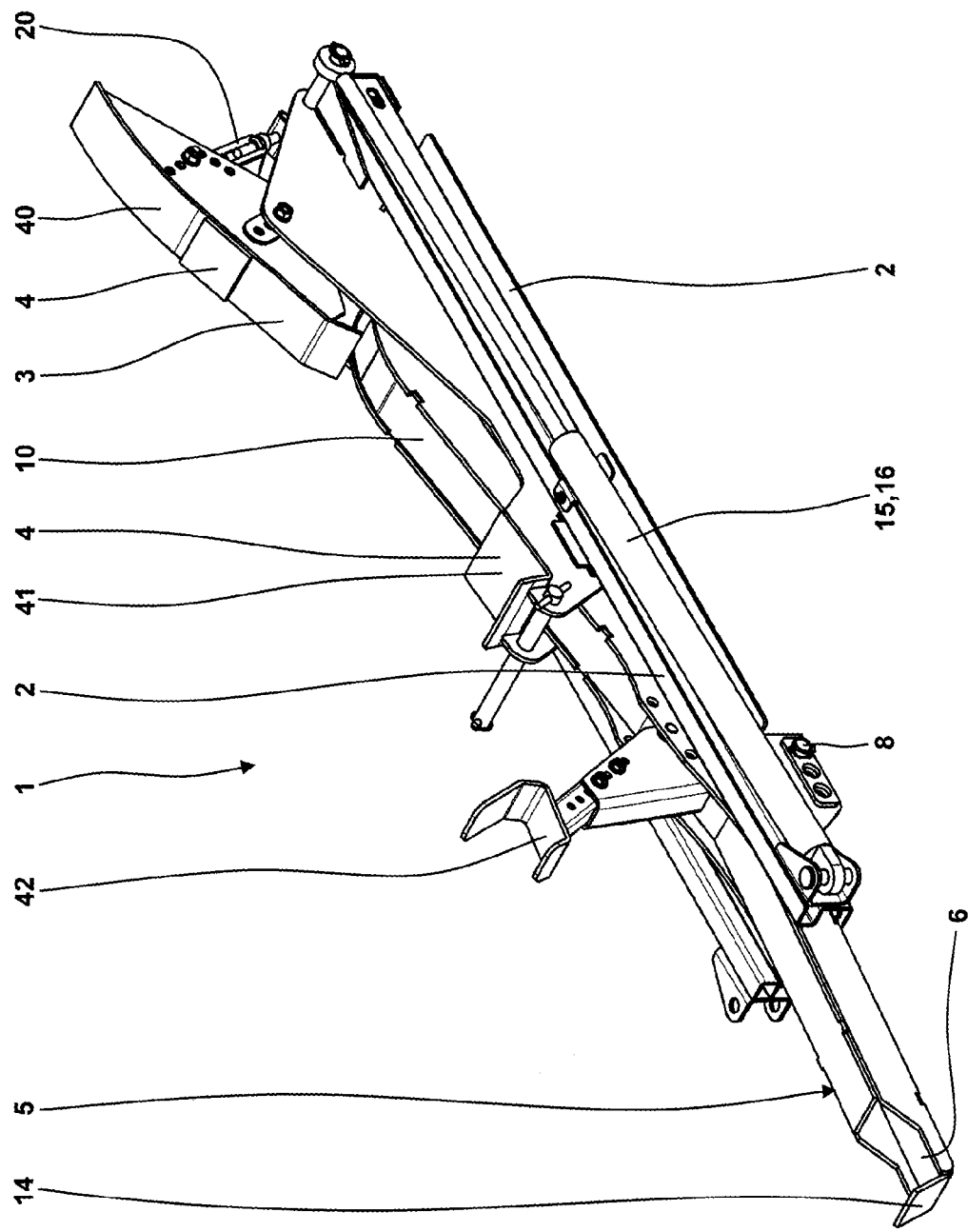
FIG. 26 shows a side of view of a further exemplary embodiment of the loading and transport apparatus.
Figure 27:
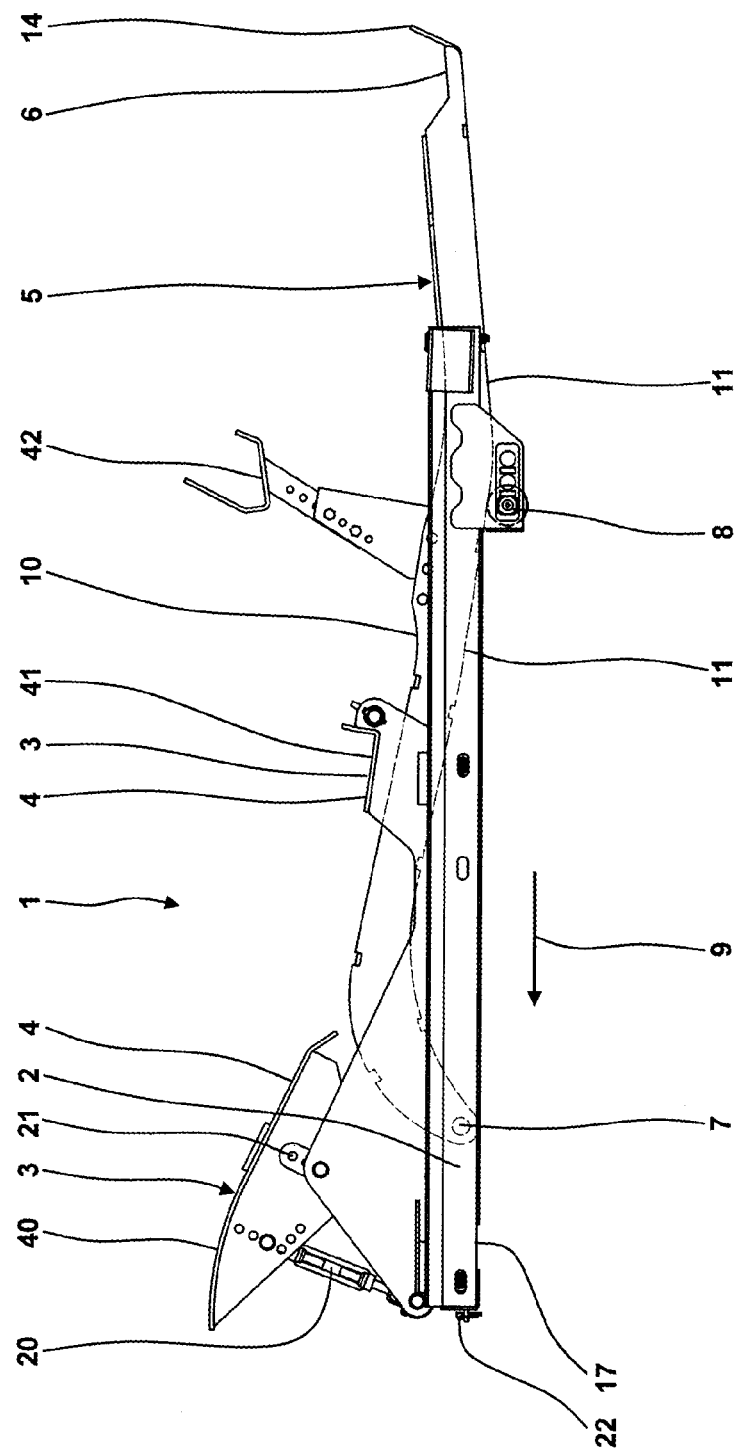
FIG. 27 shows a side of view of the exemplary embodiment of the loading and transport apparatus of FIG. 26 in an intermediate position.
Figure 28:
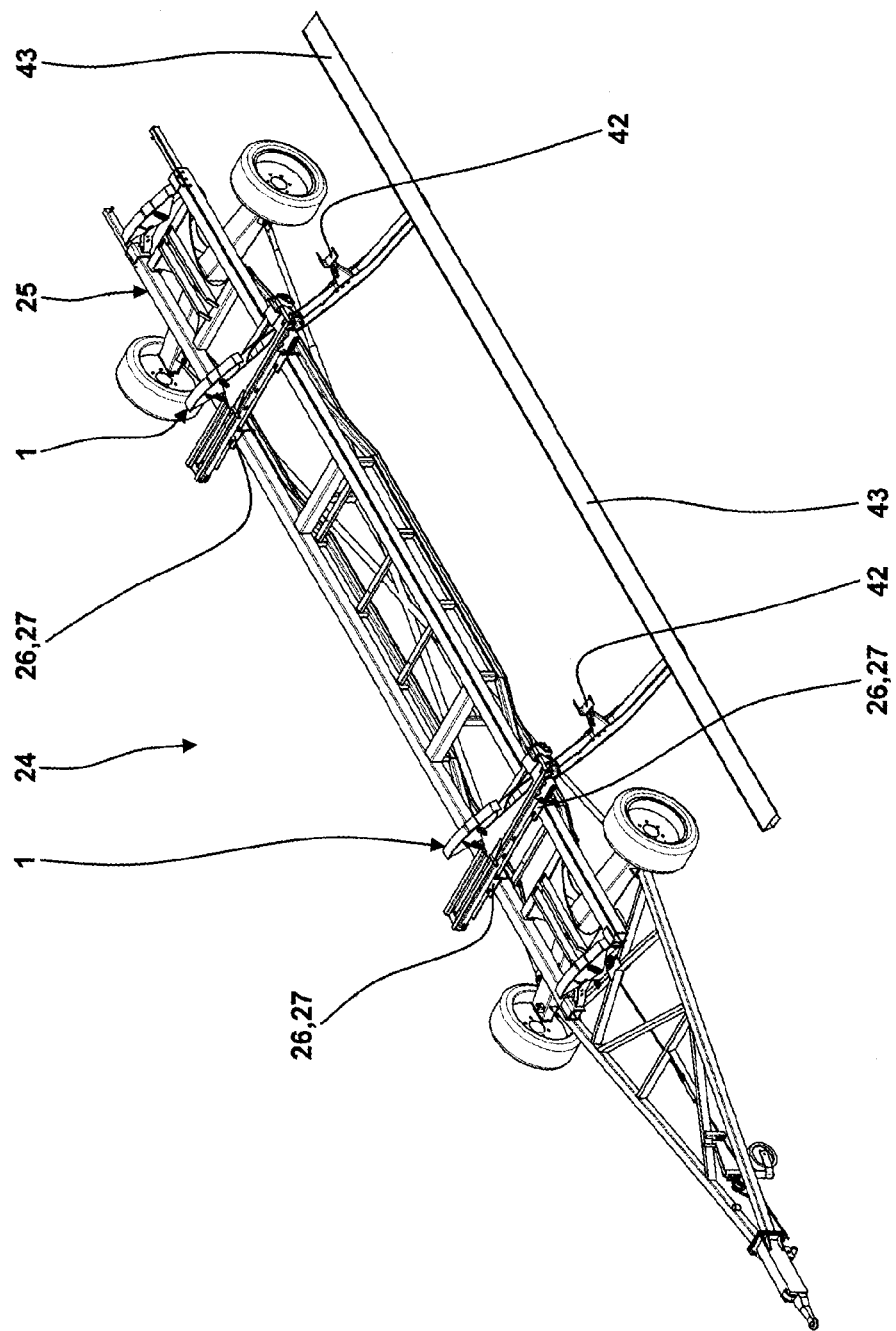
FIG. 28 shows a side of view of a further exemplary embodiment of a trailer including a plurality of novel loading and transport apparatuses according to FIG. 26.

FIGS. 26, 27 and 28 show different views of a further exemplary embodiment of the novel loading and transport apparatus 1. As this embodiment of the apparatus 1 has most features in common with the above described embodiments, for such features reference is made to description above.

In contrast to the above described embodiments, the second support device 5 includes an additional third rest surface 42 for supporting a front portion of the secondary tool 32. The second rest surface 6 then supports the rear portion of this tool 32. The third rest surface 42 is height-adjustable to be capable of adapting it to different types and sizes of secondary tools 32 to be supported thereby.

As can be seen in FIG. 28, when the second rest surfaces 6 of the loading and transport apparatuses 1 are arranged at the trailer 24, they can serve to support a support bar 43 used for secure support of the secondary tool 32 over its entire working width.

The invention claimed is:
1. An apparatus for an agricultural header or implement, comprising a primary tool and a secondary tool, the apparatus comprising:
   a guide frame;
   a first support device that is movably arranged on the guide frame and has a first rest surface for holding the primary tool;
   a second support device that is movably arranged on the guide frame and has a second rest surface for holding the secondary tool;
   a coupling element that is arranged on the first support device and connects the first support device to the second support device; and
   a support element that is arranged on the guide frame and contacts the second support device, wherein the coupling element and the support element are constituted and arranged such that a movement of the first support device in a first direction along the guide frame effects lifting of the second rest surface.

2. The apparatus of claim 1, wherein the second support device comprises a support arm having a guide surface that contacts the support element such that a geometry of the guide surface defines a direction of movement of the second rest surface.

3. The apparatus of claim 2, wherein the support arm is supported on the support element and the guide surface slides over the support element during the movement of the first support device.

4. The apparatus of claim 1, wherein the movement of the first support device is substantially translational.

5. The apparatus of claim 1, wherein the coupling element comprise a linkage bolt that hingeably connects the second support device to the first support device.

6. The apparatus of claim 1, wherein at least one of a position of the support element and of the coupling element relative to the guide frame is adjustable.

7. The apparatus of claim 1, wherein the second support device comprises a support arm having a first end and a second end, wherein the first end is connected to the first support device and the second end is designed as a free end, the second rest surface being arranged in the proximity of this free end.

8. The apparatus of claim 7, wherein the distance between the first end of the support arm and the second rest surface is adjustable.

9. The apparatus of claim 1, further comprising a drive connected to the first support device.

10. The apparatus of claim 9, wherein the drive comprises a piston-cylinder unit.

11. The apparatus of claim 1, wherein the primary tool and the secondary tool each comprise a cutting device.

12. A trailer for loading and transporting an agricultural header or implement that comprises a primary tool and a secondary tool, the trailer comprising:
at least one loading and transport apparatus that comprises
a guide frame;
a first support device that is movably arranged on the guide frame and has a first rest surface that holds the primary tool;
a second support device that is movably arranged on the guide frame and has a second rest surface that holds the secondary tool;
a coupling element that is arranged on the first support device and connects the first support device to the second support device; and
a support element that is arranged on the guide frame and contacts the second support device, wherein the coupling element and the support element are constituted and arranged such that a movement of the first support device in a first direction along the guide frame effects lifting of the second rest surface
wherein the at least one loading and transport apparatus is attached to the frame of the trailer.

13. The trailer of claim 12, wherein the at least one of loading and transport apparatus is mounted without holes to the frame of the trailer.

14. The trailer of claim 13, wherein the at least one of loading and transport apparatus is adjustably attached to the frame of the trailer by a plurality of clamps.

15. The trailer of claim 12, wherein the at least one loading and transport apparatus has a loading position and a transport position, wherein a distance in a vertical and horizontal direction between the second rest surfaces of the second support device of the loading and transport apparatuses and the frame of the trailer is maximal in the loading position and minimal in the transport position.

* * * * *